(12) United States Patent
Fukasawa

(10) Patent No.: US 7,503,054 B2
(45) Date of Patent: Mar. 10, 2009

(54) OPTICAL DISK DEVICE

(75) Inventor: Akihiro Fukasawa, Kyoto (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 602 days.

(21) Appl. No.: 10/528,996

(22) PCT Filed: Sep. 16, 2003

(86) PCT No.: PCT/JP03/11791

§ 371 (c)(1), (2), (4) Date: Mar. 24, 2005

(87) PCT Pub. No.: WO2004/053864

PCT Pub. Date: Jun. 24, 2004

(65) Prior Publication Data

US 2006/0072384 A1    Apr. 6, 2006

(30) Foreign Application Priority Data

Dec. 6, 2002    (JP) .............................. 2002-354777

(51) Int. Cl.
*G11B 17/03* (2006.01)
(52) U.S. Cl. ..................................... 720/608
(58) Field of Classification Search ................ 720/608, 720/601, 605, 604, 610, 700; 369/75.2
See application file for complete search history.

(56) References Cited

U.S. PATENT DOCUMENTS

| | | | | |
|---|---|---|---|---|
| 4,680,748 A | * | 7/1987 | Kobayashi | .................. 720/610 |
| 5,172,361 A | * | 12/1992 | Urushibata et al. | .......... 720/605 |
| 5,177,731 A | * | 1/1993 | Tanaka et al. | ............... 720/700 |
| 5,237,555 A | | 8/1993 | Tsuruta et al. | |
| 5,381,393 A | * | 1/1995 | Ohtani | ........................ 720/604 |
| 5,608,705 A | * | 3/1997 | Tanaka | ....................... 720/605 |
| 6,339,575 B1 | | 1/2002 | Suzuki | |
| 6,782,543 B2 | * | 8/2004 | Ahn | ........................... 720/601 |

(Continued)

FOREIGN PATENT DOCUMENTS

GB    2347263 A  *  8/2000

(Continued)

*Primary Examiner*—Tianjie Chen
(74) *Attorney, Agent, or Firm*—Birch, Stewart, Kolasch & Birch, LLP

(57) ABSTRACT

An object of the present invention is to perform a pickup feed operation and a turntable raising/lowering operation by the use of a rotatable drive source mechanism (54) for rotatably driving an optical disk including, for example, a CD while avoiding interference between an optical pickup (57) and the same drive source (54) in an optical disk device (1) for recording and reproducing a signal on the optical disk. To accomplish the above-mentioned object, a dual-purpose drive source mechanism (62, 64, 65, 66, 67, 68) generates a driving force for a pickup drive mechanism (57*a*) and a turntable raising/lowering mechanism (51*c*, 15). The operation of switching a transmission path of the driving force of the dual-purpose drive source mechanism (62, 64, 65, 66, 67, 68) from a path leading to the pickup drive mechanism (57*a*) to a path leading to the turntable raising/lowering mechanism (51*c*, 15), or vice versa is performed by an operation independent of the optical pickup (57) under the driving force of the dual-purpose drive source mechanism (62, 64, 65, 66, 67, 68).

11 Claims, 18 Drawing Sheets

U.S. PATENT DOCUMENTS

2001/0030926 A1* 10/2001 Tanaka et al. .............. 369/75.2
2002/0163870 A1    11/2002 Ariyoshi et al.

FOREIGN PATENT DOCUMENTS

| | | |
|---|---|---|
| JP | 4-111266 A | 4/1992 |
| JP | 2000-222803 A | 8/2000 |
| JP | 2002-93013 A | 3/2002 |
| JP | 2002-269936 A | 9/2002 |
| JP | 2002-288911 A | 10/2002 |
| JP | 2002-298548 A | 10/2002 |

* cited by examiner

1 : OPTICAL DISK DEVICE
10 : LOADING UNIT
11 : MAIN CHASSIS
12 : DISK TRAY
18 : CLAMPER
52 : TURNTABLE
62 : DUAL-PURPOSE MOTOR

F I G . 4
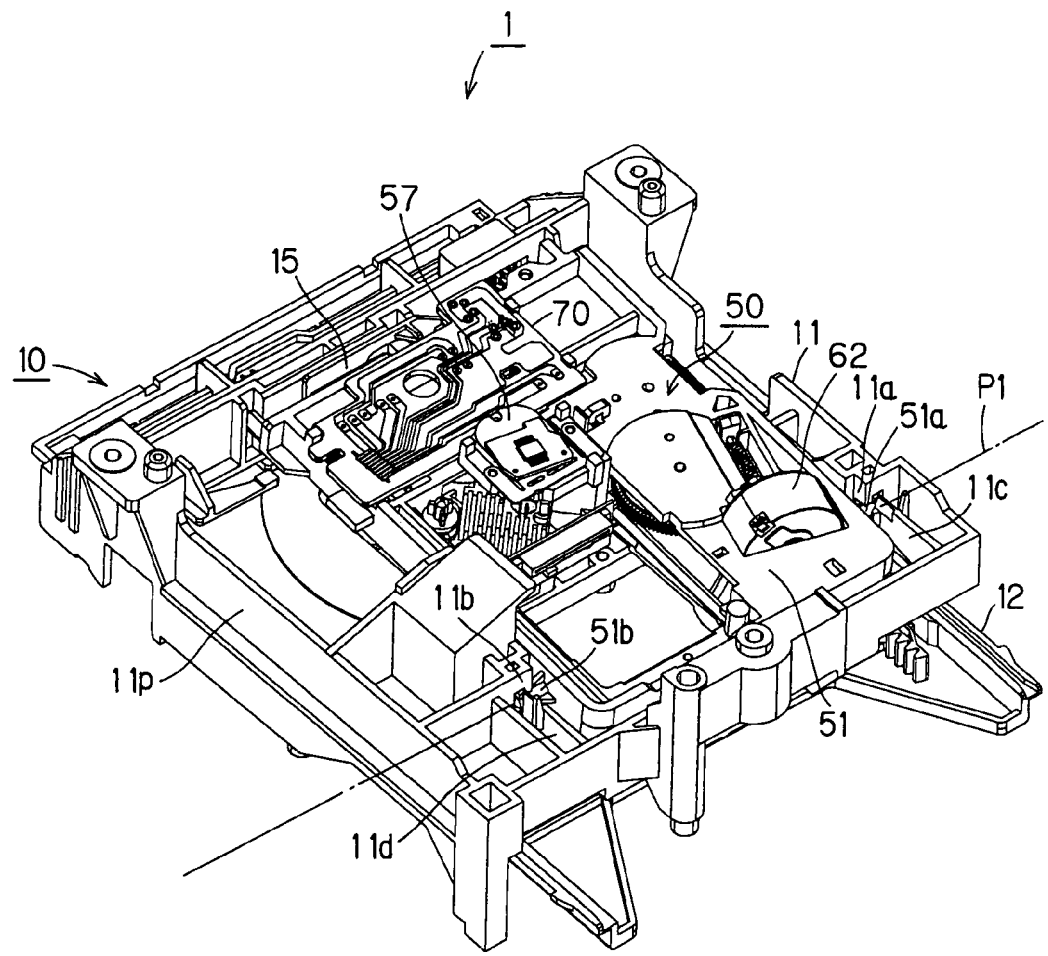
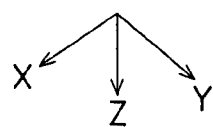

OPTICAL DISK DEVICE

TECHNICAL FIELD

The present invention relates to an optical disk device for recording a signal on an optical disk serving as an information recording medium including, for example, a compact disk (a so-called "CD") and a digital versatile disk (a so-called "DVD") and the like, or for reproducing a recorded signal.

BACKGROUND ART

Some optical disk devices are constructed to include a front panel formed with an opening through which a disk tray enters and exits. In such an optical disk device, after an optical disk is placed on the disk tray exiting through the opening, the optical disk together with the disk tray is drawn into a predetermined position inside the device.

In this type of disk device, after the optical disk is drawn and stored in the inside of the device, a turntable moves upwardly from a predetermined lowered position to a predetermined raised position, and the optical disk is placed on the turntable and held between the turntable and a clamper. In this condition, the optical disk is then rotated at a predetermined rpm by the rotation of the turntable.

For example, in a reproducing operation, a recording and reproducing device reproduces a signal recorded on the optical disk. Specifically, the reproduction of a predetermined information signal is carried out by reciprocally moving an optical pickup for signal reading between an outer region and an inner region of the optical disk in accordance with the track position of the signal recorded in a predetermined area of the optical disk.

An optical disk device of the above-mentioned type necessitates a total of four basic operations requiring the driving force of a motor and the like: a disk transport operation for reciprocally moving the disk tray inwardly or outwardly of the device to transport the optical disk inwardly or outwardly of the device; a turntable raising/lowering operation for reciprocally moving the turntable between the predetermined lowered position and the predetermined raised position; a disk rotating operation for rotatably driving the turntable to rotate the optical disk; and a pickup feed operation for reciprocally moving the optical pickup between the outer region and the inner region of the optical disk.

Typically, of the above-mentioned four operations, the disk rotating operation and the pickup feed operation have been performed by respective purpose-built motors, and the disk transport operation and the turntable raising/lowering operation have been performed continuously by a single motor.

On the other hand, there is a prior art optical disk device such that a single motor effects a total of three operation: the above-mentioned disk transport operation, the above-mentioned turntable raising/lowering operation and the above-mentioned pickup feed operation, so that all of the operations including the above-mentioned disk rotating operation are performed by a total of two motors (see, for example, the publication of Japanese Patent Application Laid-Open No. 2000-222803).

In this optical disk device, a power transmission mechanism switching mechanism is operated in response to the operation of moving the optical pickup further inwardly of the data area of the optical disk, to perform switching between a driving mechanism for the pickup feed operation and a driving mechanism for the turntable raising/lowering operation, for transmission of the driving force of the motor.

However, the operation of the power transmission mechanism switching mechanism itself is performed in response to the operation of moving the optical pickup itself further inwardly of the data area of the optical disk in the optical disk device disclosed in the above-mentioned publication. For switching between the pickup feed operation and the turntable raising/lowering operation, it is necessary to move the optical pickup further widely inwardly from the data area of the optical disk. However, a spindle motor for the disk rotating operation is provided near the center of an inner region of the optical disk.

For this reason, it is necessary to provide a space for movement of the optical pickup between the mounting surface of the spindle motor and the rear surface of the turntable to avoid the interference of the optical pickup with an outer peripheral part of the spindle motor during the inward movement of the optical pickup from the data area of the optical disk.

To achieve this, for example, the spindle motor having a protruding rotation shaft as long as about 20 mm from the mounting surface of the spindle motor is used (typically about 8 mm), and the optical pickup itself having a relatively thin structure with a height of less than about 20 mm is adopted.

However, the shaft runout of the rotation shaft increases in proportion to a distance from the mounting surface of the spindle motor to the rear surface (or the disk holding surface) of the turntable (that is, the length of the rotation shaft). As the distance increases, the amount of eccentricity (the runout of the rotation axis) of the optical disk rotating integrally with the turntable accordingly increases. In some instances, there is a danger that no signals can be recorded on the optical disk or reproduced.

Further, the relatively thin optical pickup having a height of about 20 mm, which is required to refract the optical path of a laser with respect to the direction of the impingement of the laser on the optical disk, causes the addition of optical parts to result in increased costs as compared with an optical pickup of a non-refraction type. That is, there has been a problem that it is impossible to use an inexpensive optical pickup so that the device is not constructed at low costs.

DISCLOSURE OF INVENTION

It is an object of the present invention to provide an optical disk device capable of avoiding interference between an optical pickup and a rotatable drive source for rotatably driving the optical disk and capable of performing a pickup feed operation and a turntable raising/lowering operation by using the same drive source.

A optical disk device according to the present invention is an optical disk device capable of storing and ejecting an optical disk for recording or reproducing a signal on the optical disk stored therein, the optical disk device comprising: a turntable for rotatably supporting the optical disk stored; a rotatable drive source mechanism for rotatably driving said turntable; a turntable raising/lowering mechanism for vertically moving said turntable between a lowered position in which interference with the optical disk stored or ejected is avoided and a raised position in which the optical disk stored is supportable; an optical pickup for recording a signal on the optical disk supported by said turntable or reproducing a signal; a pickup drive mechanism for reciprocally moving said optical pickup between an inner region and an outer region of the optical disk supported by said turntable; a dual-purpose drive source mechanism for generating a driving force for said turntable raising/lowering mechanism and said pickup drive mechanism; and a first operation switching mechanism for performing a first switching operation for switching a transmission path of the driving force of said dual-purpose drive source mechanism from a path leading to said pickup drive mechanism to a path leading to said turntable raising/lowering mechanism, or vice versa, wherein said first operation switching mechanism performs said first switching operation by an operation independent of said optical pickup under the driving force of said dual-purpose drive source mechanism.

In the optical disk device according to the present invention, the first operation switching means performs the first switching operation by the operation independent of the optical pickup under the driving force of the dual-purpose drive source mechanism. Thus, the optical pickup need not be moved further toward the inner region of the optical disk during the first switching operation. This avoids the interference between the optical pickup and the rotatable drive source mechanism while using the same dual-purpose drive source to perform the pickup feed operation and the turntable raising/lowering operation.

These and other objects, features, aspects and advantages of the present invention will become more apparent from the following detailed description of the present invention when taken in conjunction with the accompanying drawings.

BRIEF DESCRIPTION OF DRAWINGS

FIG. 4 is a perspective view of the optical disk device with the disk tray in the retracted position as viewed from below in an oblique direction.

BEST MODE FOR CARRYING OUT THE INVENTION

<Basic Construction>

Figure 1:
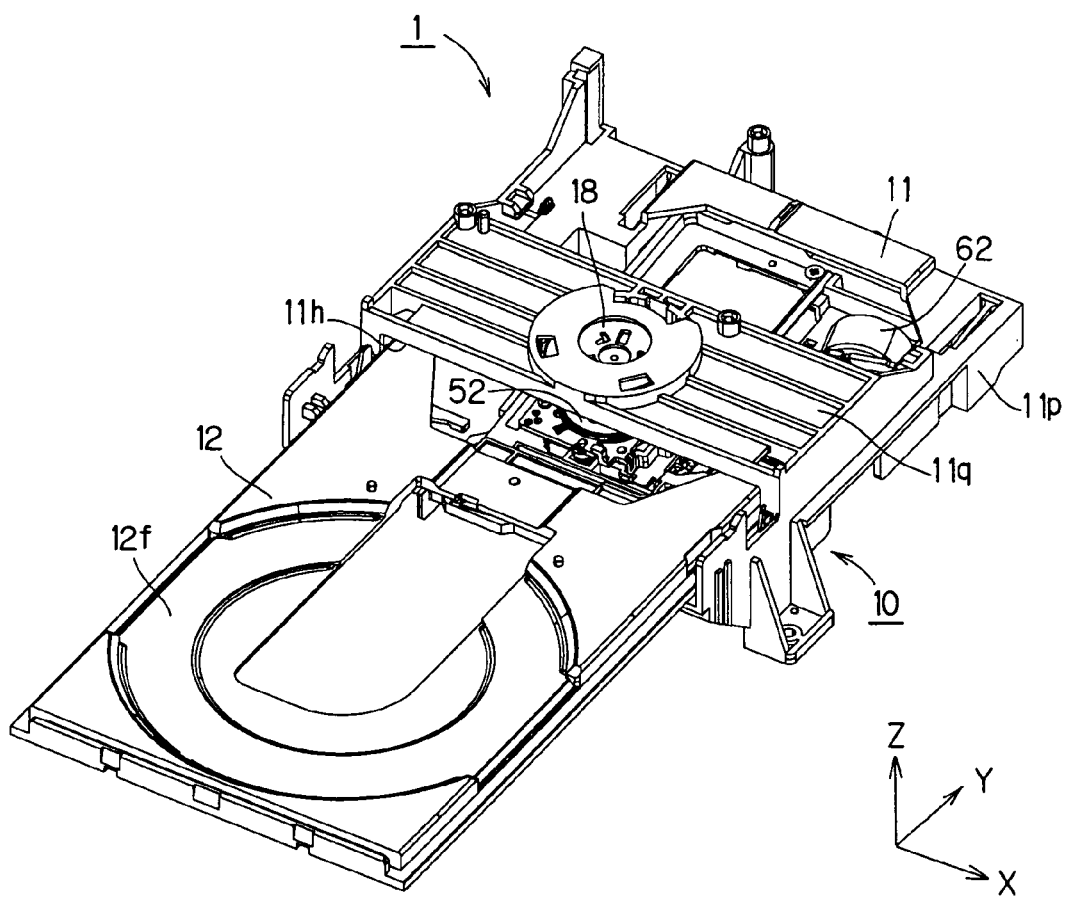
FIG. 1 is a perspective view of an optical disk device with a disk tray in an extended position as viewed from above in an oblique direction according to an embodiment of the present invention.
Figure 2:
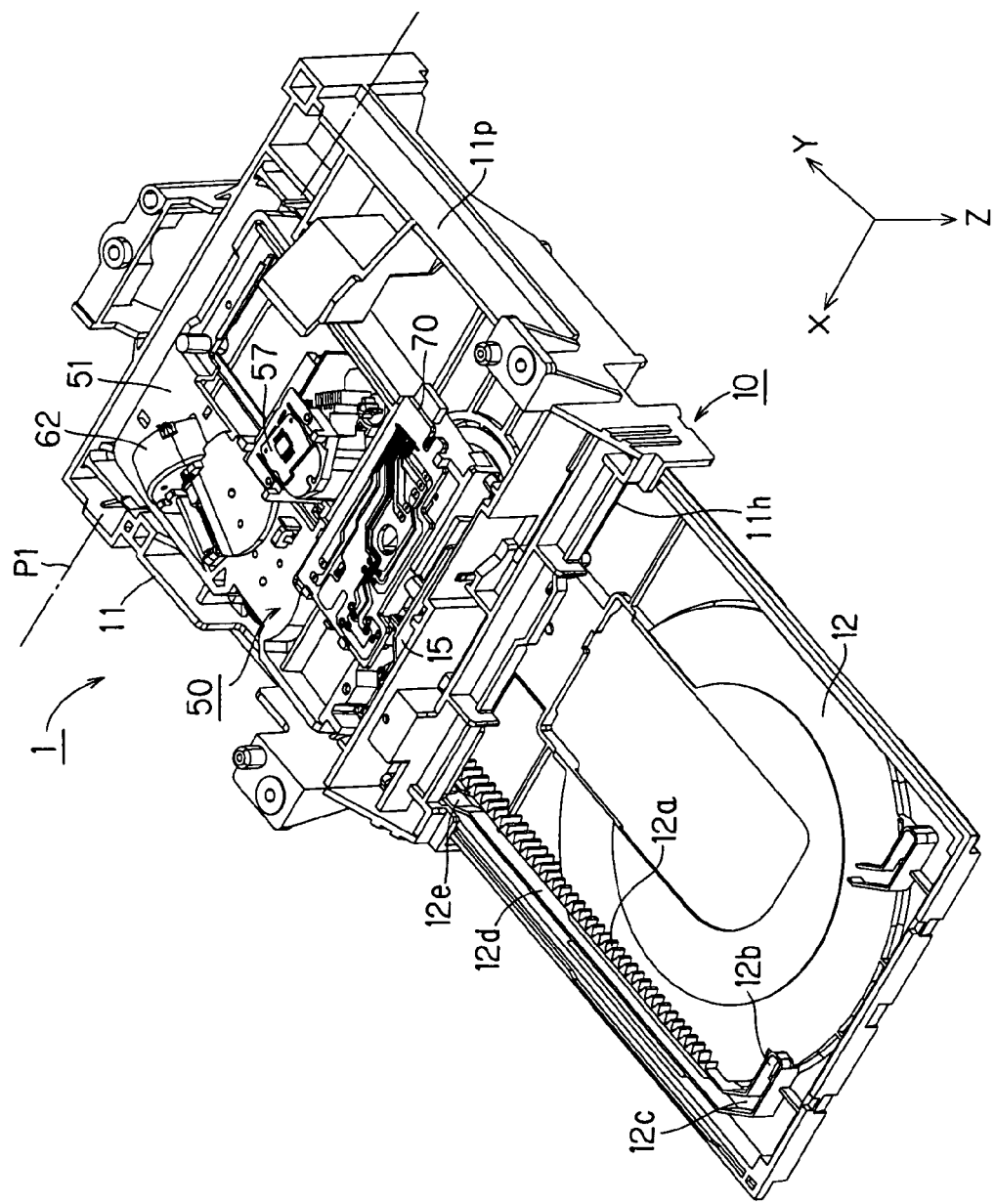
FIG. 2 is a perspective view of the optical disk device with the disk tray in the extended position as viewed from below in an oblique direction.
Figure 3:
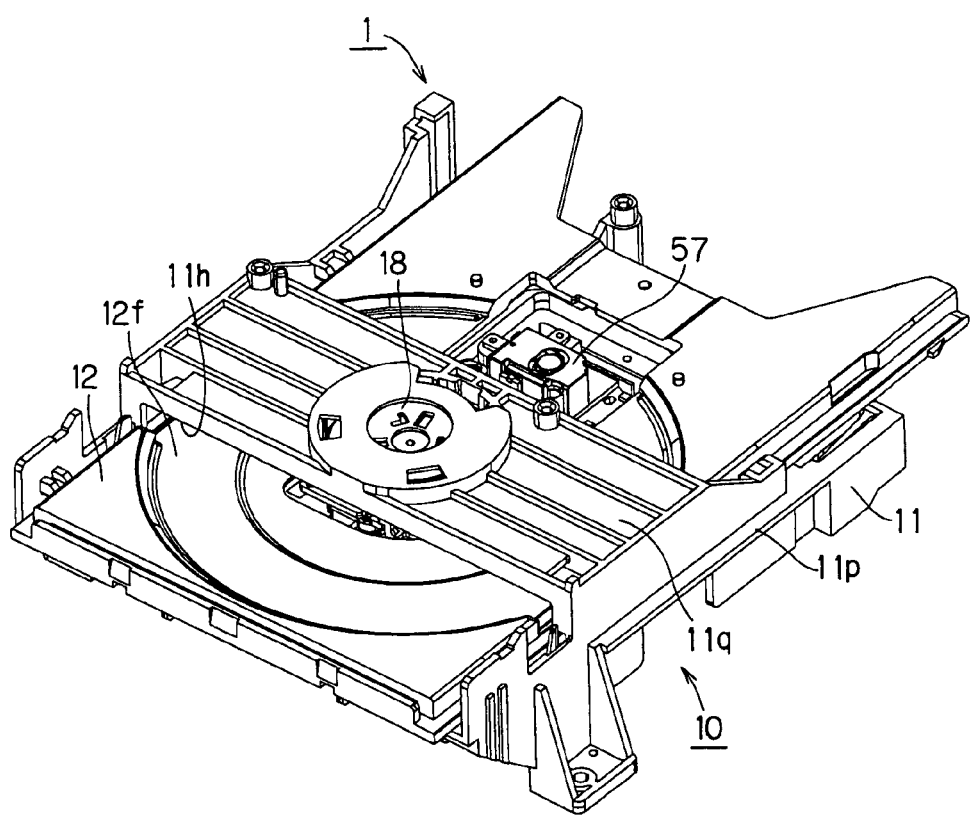
FIG. 3 is a perspective view of the optical disk device with the disk tray in a retracted position as viewed from above in an oblique direction.

First, the general construction of an entire optical disk device will be described. FIG. 1 is a perspective view of the optical disk device with a disk tray in an extended position as viewed from above in an oblique direction. FIG. 2 is a perspective view of the optical disk device with the disk tray in the extended position as viewed from below in an oblique direction. FIG. 3 is a perspective view of the optical disk device with the disk tray in a retracted position as viewed from above in an oblique direction. FIG. 4 is a perspective view of the optical disk device with the disk tray in the retracted position as viewed from below in an oblique direction. For purposes of illustration, an axis parallel to directions in which the disk tray is extended and retracted is defined as a Y axis (the direction in which the disk tray is retracted is defined as a (+)Y direction, and the direction in which the disk tray is extended is defined as a (−)Y direction), an axis orthogonal to the above-mentioned Y axis on a surface of the disk tray for placing an optical disk thereon is defined as an X axis (the rightward direction with respect to the positive (+) direction of the Y axis is defined as a (+)X direction, and the leftward direction with respect to the positive (+) direction of the Y axis is defined as a (−)X direction), and an axis orthogonal to the surface of the disk tray for placing the optical disk thereon is defined as a Z axis (the direction in which the surface for placing the optical disk thereon faces is defined as a (+)Z direction, and its opposite direction is defined as a (−)Z direction) throughout this embodiment.

This optical disk device 1 comprises a main chassis 11, and a traverse chassis 51 pivotably supported by the main chassis 11.

The main chassis 11 is a component serving as a base body of this optical disk device 1. A disk tray 12 movable for extension and retraction, and a clamper 18 are mounted to the main chassis 11.

More specifically, the main chassis 11 has a rectangular frame element 11p capable of receiving the disk tray 12. The rectangular frame element 11p is formed with an opening 11h through which the disk tray 12 can pass.

The above-mentioned disk tray 12 is in the form of a substantially rectangular plate receivable in the above-mentioned rectangular frame element 11p. A receiving tray portion 12f for placing an optical disk in a predetermined position of the disk tray is provided on one main surface side of the disk tray 12.

The disk tray 12 reciprocally moves along the directions of the Y axis to retract through the above-mentioned opening 11h into the rectangular frame element 11p of the main chassis 11 or to extend outwardly from the rectangular frame element 11p. With the disk tray 12 extended outwardly from the main chassis 11, the optical disk is placed on the receiving tray portion 12f. Thereafter, the disk tray 12 moves to retract into the main chassis 11, whereby the optical disk is stored in the optical disk device 1. With the optical disk stored in the optical disk device 1, the disk tray 12 moves to extend outwardly of the main chassis 11, whereby the optical disk is ejected from this optical disk device 1.

A bridge piece 11q is provided so as to extend between the opposite side pieces of the main chassis 11. The clamper 18 is rotatably supported by the bridge piece 11q.

The clamper 18 is supported in a position upward (in the (+)Z direction) of the level of the path of movement of the disk tray 12 and the optical disk so as not to interfere with the disk tray 12 and the optical disk which reciprocally move along the directions of the Y axis. A magnet 17 (see FIG. 10) is contained inside the clamper 18, and the clamper 18 and a turntable 52 to be described below attract each other because of the magnetic force of the magnet 17 to attach to and hold the optical disk therebetween.

The traverse chassis 51 is a base body of such size as to be accommodated in the above-mentioned rectangular frame element 11p as seen in plan view. A pivot axis side end portion of the traverse chassis 51 toward which the disk tray 12 is retracted (in the (+)Y direction) is supported by the main chassis 11 pivotably about a predetermined pivot axis P1 (see FIGS. 2 and 4).

The pivotable support is achieved, for example, by the following construction. A pair of protruding rotation shafts 51a and 51b extending along the directions of the X axis are formed on opposite sides of the pivot axis side end portion of the traverse chassis 51. The main chassis 11 includes a pair of bearing portions composed of shaft supporting portions 11a and 11b of generally U-shaped configuration and elastically deformable shaft holding portions 11c and 11d, and capable of rotatably holding the above-mentioned rotation shafts 51a and 51b (see FIG. 4). The pair of rotation shafts 51a and 51b are supported by the above-mentioned pair of bearing portions rotatably about the above-mentioned pivot axis P1, whereby the traverse chassis 51 is pivotably supported.

The turntable 52 is provided near the forward end of a pivotal displacement side end portion of the traverse chassis 51 toward which the disk tray 12 is extended (in the (−)Y direction). The turntable 52 is formed of a material having the property of being attracted by a magnetic force of iron or the like, and the optical disk is held between the turntable 52 and the clamper 18. In this condition, the turntable 52 rotates integrally with the optical disk under the driving force of a spindle motor 54 (see FIG. 5) serving as a rotatable drive source mechanism to be described later.

An optical pickup 57 is supported by the traverse chassis 51 movably along the directions of the Y axis. This optical pickup 57 records a signal on the optical disk or reproduces a signal recorded on the optical disk.

Figure 10:
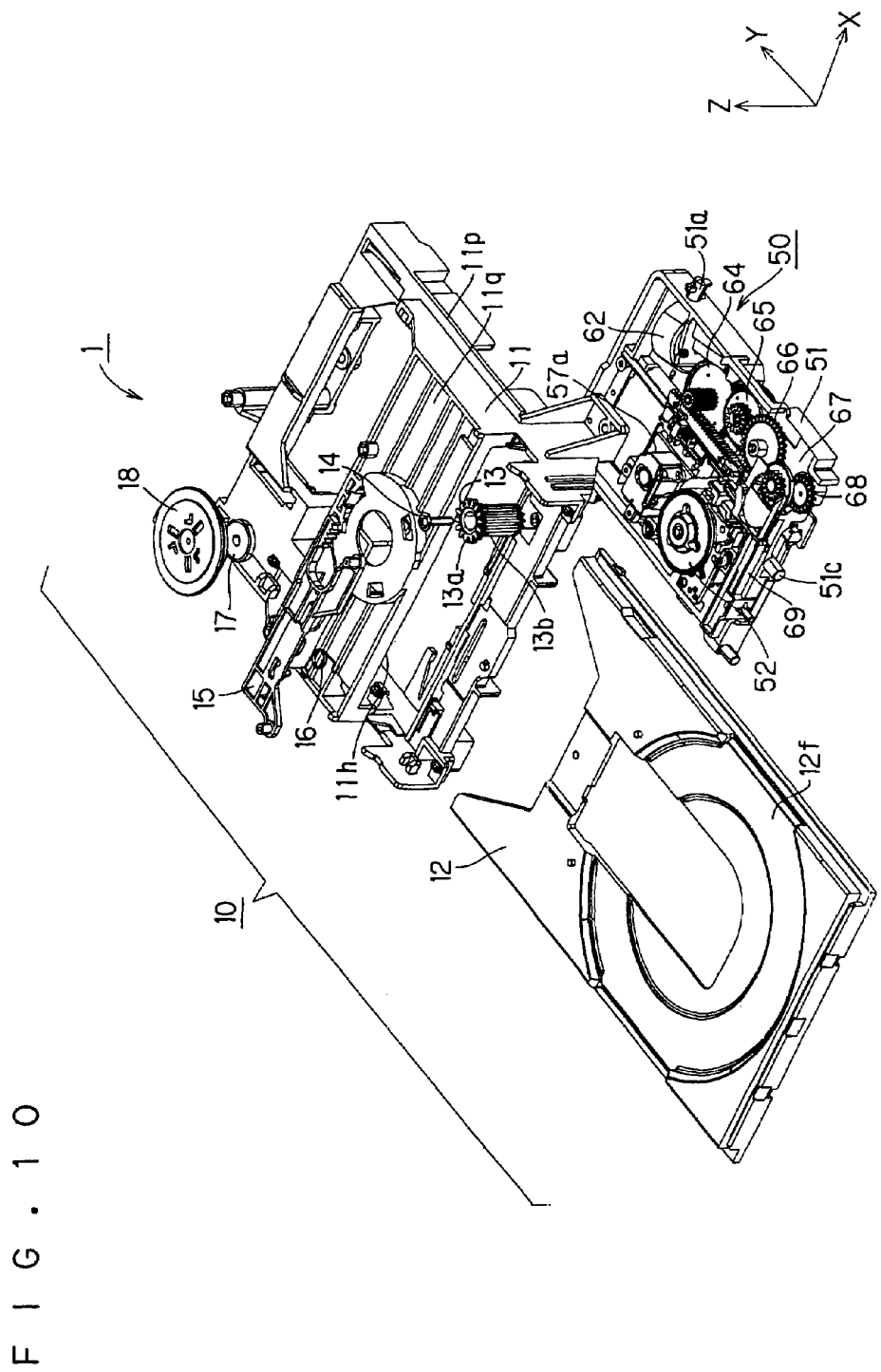
FIG. 10 is an exploded perspective view showing the optical disk device.

A portion composed of the traverse chassis 51 and various parts including the turntable 52, the optical pickup 57 and the like which are incorporated in the traverse chassis 51 is referred to hereinafter as a traverse unit 50, and a portion composed of other various parts, that is, parts including the main chassis 11, the disk tray 12 incorporated in the main chassis and the like is referred to hereinafter as a loading unit 10 (see FIG. 10).

Next, the general operation of this optical disk device 1 will be described.

Figure 14:
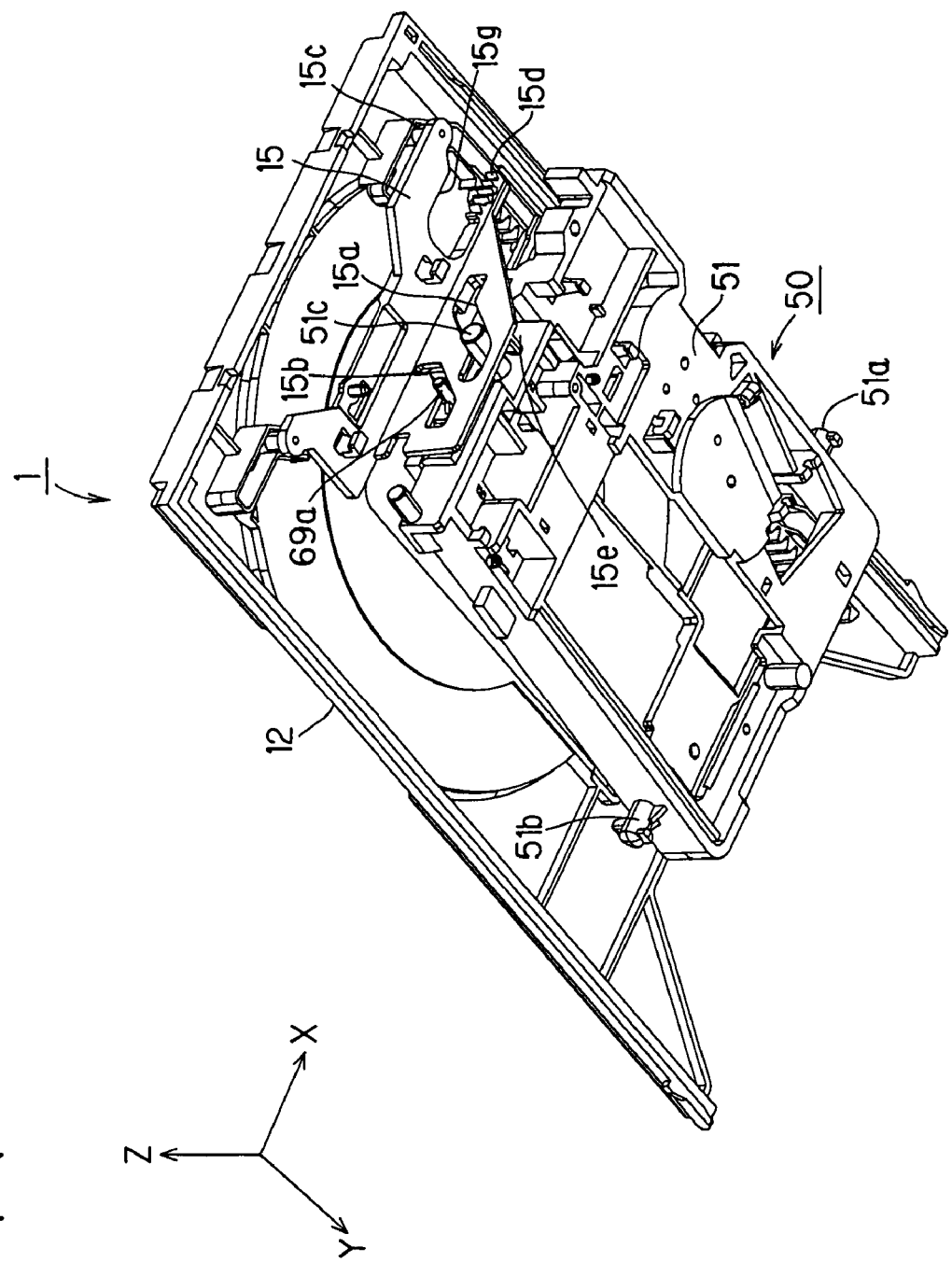
FIG. 14 is a perspective view showing a positional relationship between the principal parts of the optical disk device with the turntable in a lowered position.

As shown in FIG. 2, with the disk tray 12 extended outside this device 1, the traverse chassis 51 provided with the turntable 52, the optical pickup 57 and the like is pivoted about the rotation shafts 51a and 51b in such a direction that the pivotal displacement side end portion of the traverse chassis 51 is spaced apart from the turntable 52 in order to avoid interference with the optical disk drawn into the device 1 and the turntable 52, and is in an inclined position with respect to the main chassis 11 (see FIG. 14).

After the disk tray 12 is moved to retract into the main chassis 11 by a disk transport mechanism (to be detailed later), the traverse chassis 51 is pivoted about the pivot axis P1 into a position parallel to the main chassis 11 by a turntable raising/lowering mechanism (to be detailed later) at the time that the optical disk reaches a position directly over the turntable 52 (see FIG. 13). This operation causes the turntable 52 to move upwardly.

Because of the upward movement of the turntable 52, the clamper 18 is attracted to the turntable 52 by the force of attraction of the magnet 17 therein, whereby the optical disk is held between the clamper 18 and the turntable 52. In this condition, the rotatable driving of the spindle motor 54 to be described later which is directly coupled to the turntable 52 rotates the optical disk together with the turntable 52 at a predetermined rpm. Then, the optical pickup 57 is moved in a predetermined radial direction (in a direction of the Y axis in the figures) of the optical disk by a pickup drive mechanism (to be detailed later) to record an information signal on a predetermined data area on the optical disk or reproduce an information signal. The optical disk, after the recording or reproduction of the information signal, is ejected outwardly from the device 1 by sequentially reversing the above-mentioned operations.

<Description about Traverse Unit>

Figure 5:
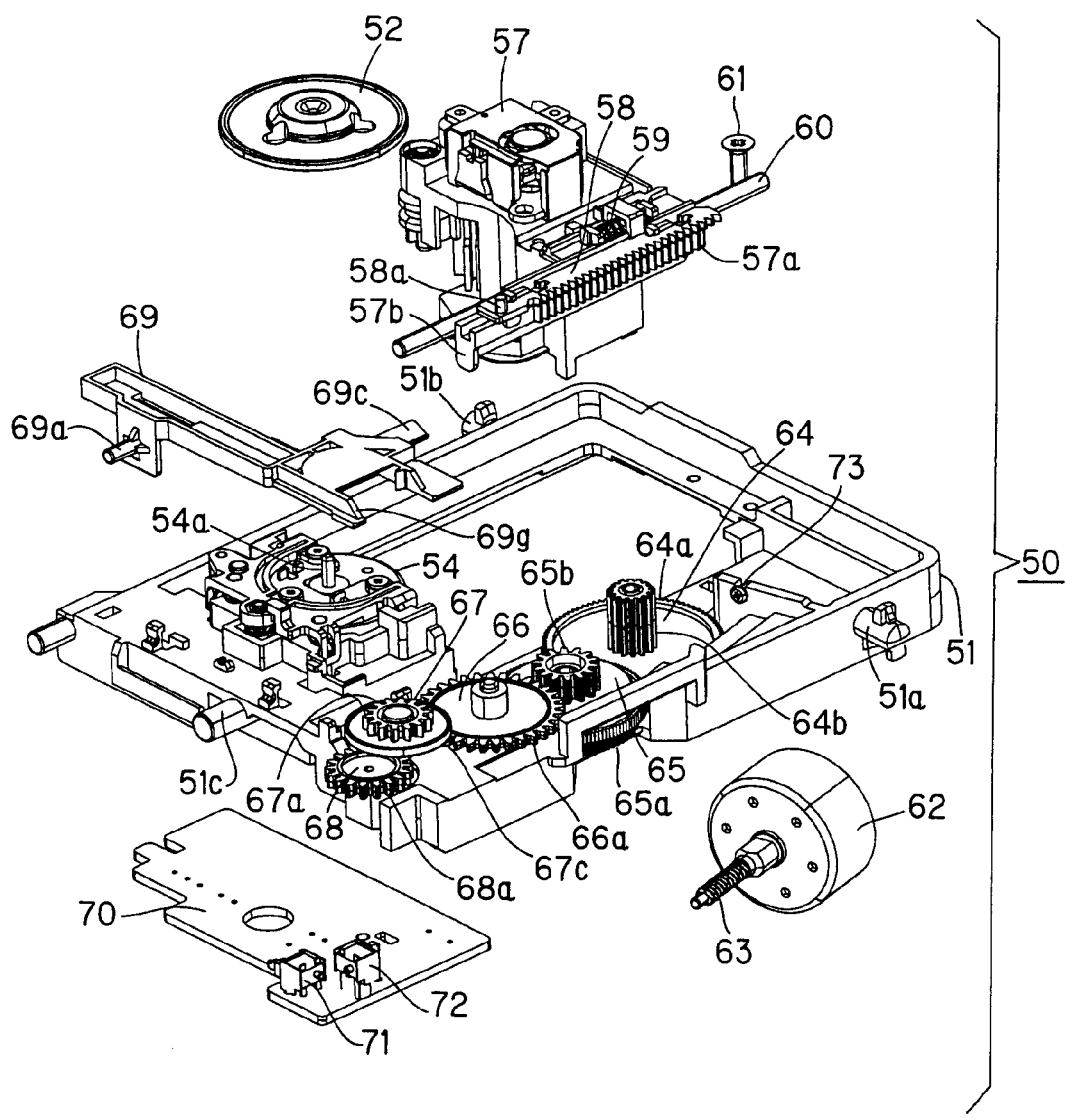
FIG. 5 is an exploded perspective view showing a traverse unit.
Figure 5:
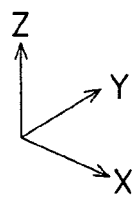

The construction of the traverse unit 50 will be described in further detail. FIG. 5 is an exploded perspective view showing the traverse unit 50. As described above, the traverse chassis 51 is a component serving as the base body of the traverse unit 50, and is formed with the above-mentioned pair of protruding rotation shafts 51a and 51b on the opposite sides of the pivot axis side end portion thereof, and a driven boss portion 51c protruding from an end surface of the pivotal displacement side end portion of the traverse chassis 51. The driven boss portion 51c is provided in a first cam groove 15a of a cam slider 15 serving as a slider member, which will be detailed later, so that the traverse chassis 51 is pivoted in response to the extending and retracting movements of the disk tray 12.

The turntable 52 and the spindle motor 54 are provided near the above-mentioned pivotal displacement side end portion of the traverse chassis 51.

The spindle motor 54 is fixed to the traverse chassis 51, with a rotation shaft 54a thereof directed toward the disk tray 12 side. The tip of the rotation shaft 54a is pressed into the central hole of the turntable 52, whereby the turntable 52 is rotatably supported on the disk tray 12 side of the traverse chassis 51. The rotatable driving of the spindle motor 54 rotates the turntable 52.

The optical pickup 57 is provided on the disk tray 12 side of the traverse chassis 51 and between the above-mentioned turntable 52 and the pivot axis side end portion. The traverse chassis 51 is formed with a required opening in a region wherein the optical pickup 57 is disposed and its front and rear regions arranged in the directions of the Y axis so as to prevent interference with the optical pickup 57.

The optical pickup 57 is guided and supported movably along the directions of the Y axis by a main shaft guide 60 extending along the directions of the Y axis.

Specifically, the main shaft guide 60 is formed to have a rod-shaped configuration. One end portion ((+)Y direction side end portion) of the main shaft guide 60 is fixed to the traverse chassis 51 by a flat head screw 61, and the other end portion ((−)Y direction side end portion) of the main shaft guide 60 is fitted, supported and fixed in a bearing hole (not shown) formed in the traverse chassis 51. One side portion of the optical pickup 57 is slidably inserted and supported in a longitudinally intermediate portion of the main shaft guide 60, whereby the optical pickup 57 is supported movably along the directions of the Y axis (see FIGS. 7 to 9). The other side portion of the optical pickup 57 is formed as a sliding portion slidable on the traverse chassis 51.

A rack portion 57a is provided on the one side portion of the optical pickup 57 and outside the main shaft guide 60. A slide rack 58 movable along the directions of the Y axis with respect to the rack portion 57a is provided on the rack portion 57a.

The slide rack 58 is formed with rack teeth similar in arrangement and configuration to the rack teeth of the above-mentioned rack portion 57a, and a small gear portion 64b of a feed gear 64 is adapted for meshing engagement with the rack portion 57a and the slide rack 58.

The length of a region in which the rack teeth of the slide rack 58 are formed in the longitudinal direction (the direction of movement) thereof is greater than the length of a region in which the rack teeth of the above-mentioned rack portion 57a are formed. The slide rack 58 is urged along the direction of the Y axis toward the rack portion 57a by a spring 59 serving as an urging means. Specifically, the urging force of the spring 59 is applied so that an end portion, closer to the inner region of the optical disk, of the region in which the rack teeth of the slide rack 58 are formed substantially conforms with an end portion, closer to the inner region of the optical disk, of the region in which the rack teeth of the rack portion 57a are formed and so that an end portion, closer to the outer region of the optical disk, of the region in which the rack teeth of the slide rack 58 are formed slightly protrudes from an end portion, closer to the outer region of the optical disk, of the region in which the rack teeth of the rack portion 57a are formed. Thus, the small gear portion 64b of the feed gear 64 will be in meshing engagement with both the rack portion 57a and the slide rack 58 during the recording or reproduction of information on the optical disk (see FIG. 7). In a first switching operation stage (to be described later) before and after the recording or reproduction of information on the optical disk, the rack portion 57a moves toward the inner region of the optical disk than the inward position within the range of movement thereof during the above-mentioned information recording or reproduction (that is, moves to an innermost position slightly inward of the inward position within the range of movement thereof during the above-mentioned information recording or reproduction). This causes the region in which the rack teeth of the rack portion 57a are formed to be positioned closer to the inner region of the optical disk than the small gear portion 64b of the feed gear 64, to release the meshing engagement between the rack portion 57a and the small gear portion 64b while the meshing engagement is maintained between the slide rack 58 and the small gear portion 64b.

A switch pressing portion 57b is provided on a turntable 52 side end portion (that is, an end portion closer to the inner region of the optical disk stored in this device 1) of the rack portion 57a. With the rack portion 57a moved to the above-mentioned innermost position, the switch pressing portion 57b presses a second switch 72 to be described later. In this condition, the optical pickup 57 or the rack portion 57a abuts against a fixed member on the traverse chassis 51 side so that the optical pickup 57 or the rack portion 57a is inhibited from moving in the (−)Y direction.

Also in this condition, the feed gear 64 continues rotating in a predetermined direction to enable the slide rack 58 to move in the (−)Y direction with respect to the rack portion 57a against the urging force of the spring 59, with the rack portion 57a maintained in a fixed position. When the feed gear 64 is rotated in a direction opposite from the above-mentioned predetermined direction to move the slide rack 58 in the (+)Y direction in the above-mentioned condition, the slide rack 58 is moved by the spring 59 in such a manner as to be attracted in the (+)Y direction, whereby the small gear portion 64b is brought into meshing engagement with the rack portion 57a.

It should be noted that the spring 59 also has the function of preventing backlash during the meshing engagement between the slide rack 58 and the small gear portion of the feed gear 64. An end portion of the slide rack 58 closer to the turntable 52 (closer to the inner region of the optical disk) is formed with a protruding boss portion 58a engageable with a cam groove 69b of a trigger plate 69 to be described later.

A dual-purpose motor 62 is provided in a portion of the traverse chassis 51 on one side of the optical pickup 57. The dual-purpose motor 62 is used as a drive source for the disk transport operation, the turntable raising/lowering operation and the pickup feed operation. The dual-purpose motor 62 is fixed to the traverse chassis 51 by a screw 73, and has a rotation shaft pressed in a worm gear 63.

Further, the feed gear 64 is rotatably supported by the traverse chassis 51. The feed gear 64 has a large gear portion 64a which is a lower helical gear, and the small gear portion 64b which is an upper spur gear. The large gear portion 64a is adapted for meshing engagement with the worm gear 63, and the small gear portion 64b is adapted for meshing engagement with the rack portion 57a of the optical pickup 57 and the slide rack 58 without backlash.

A first gear 65, a second gear 66, a third gear 67 and a fourth gear 68 are rotatably supported by the traverse chassis 51.

The first gear 65 has a large gear portion 65a which is a lower spur gear, and a small gear portion 65b which is an upper spur gear. The second gear 66 has a spur gear portion 66a. The third gear 67 has a pair of spur gear portions 67a substantially identical in the number of teeth and in tooth module with each other over and under a disk portion 67c having a predetermined diameter (although the lower spur gear portion is not shown). The fourth gear 68 has a spur gear portion 68a, and is positioned so that a circumferential portion of the spur gear portion 68a extends outwardly of the outer perimeter of the traverse chassis 51 beyond the contour thereof. The spur gear portion 68a is always in meshing engagement with a tray gear 13 (to be described later) on the main chassis 11 to be described later.

The large gear portion 65a of the first gear 65 is in meshing engagement with the large gear portion 64a of the feed gear 64. The small gear portion 65b of the first gear 65 is in meshing engagement with the spur gear portion 66a of the second gear 66. The spur gear portion 66a of the second gear 66 is in meshing engagement with the lower spur gear portion of the third gear 67. The lower spur gear portion of the third gear 67 is further in meshing engagement with the spur gear portion 68a of the fourth gear 68. The feed gear 64, the first gear 65, the second gear 66, the third gear 67 and the fourth gear 68 constitute a power transmission mechanism for transmitting the driving force to each mechanism under the rotatable driving force of the dual-purpose motor 62. The power transmission mechanism and the dual-purpose motor 62 constitute a dual-purpose drive source mechanism for generating the driving force for each mechanism.

By appropriately combining these gears 64, 65, 66, 67 and 68, the rotation of the dual-purpose motor 62 is decelerated down to a desired rpm and transmitted to the gears 64, 65, 66, 67 and 68.

Figure 6:
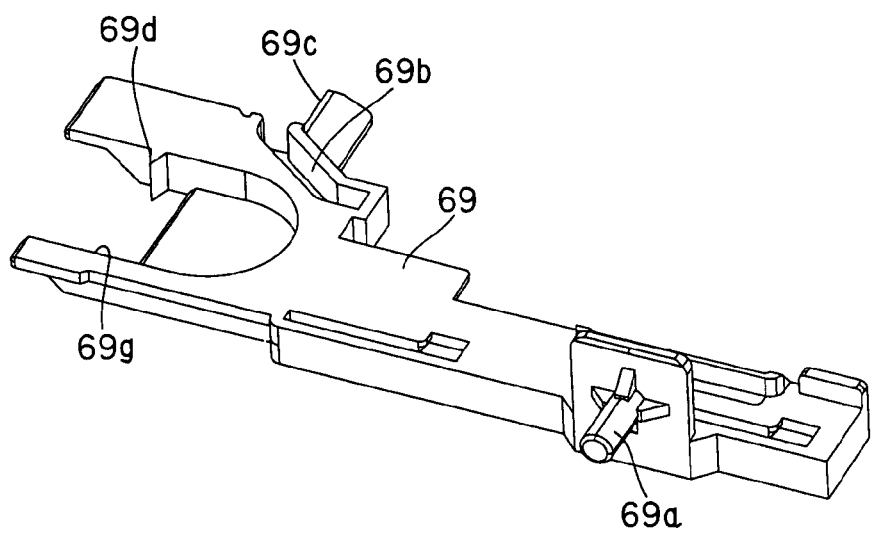
FIG. 6 is a perspective view showing a trigger plate 69.
Figure 6:
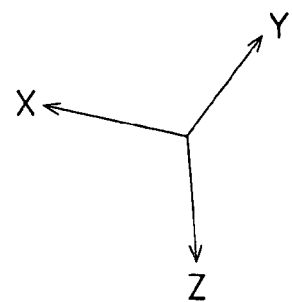

The trigger plate 69 is supported on the pivotal displacement side end portion of the traverse chassis 51 movably substantially along the directions of the X axis. FIG. 6 is a perspective view showing the trigger plate 69.

This trigger plate 69 is formed to have a entirely substantially elongated configuration, and is provided with a protruding boss portion 69a engageable with the cam slider 15 to be described later in one side portion on one end thereof. The boss portion 69a is also inserted in a guide groove 11f on the main chassis 11 side, whereby this trigger plate 69 is guided and supported.

The other end portion of the trigger plate 69 is formed with a recessed portion 69g of a substantially U-shaped configuration. A single protruding tooth portion 69d is formed on one side portion of the recessed portion 69g. The upper spur gear portion 67a of the above-mentioned third gear 67 rotates in the recessed portion 69g, whereby the tooth portion 69d comes into meshing engagement with the spur gear portion 67a. This causes the trigger plate 69 to move in a predetermined direction under the driving force of the above-mentioned dual-purpose motor 62.

The cam groove 69b is formed in the other end portion of the trigger plate 69 and in the other side portion closer to an intermediate portion of the trigger plate 69 than the above-mentioned recessed portion 69g. The cam groove 69b is formed in the shape of a groove engageable by the boss portion 58a of the slide rack 58, and is bent midway in a direction in which the cam groove 69b extends. The slide rack 58 moves in the (−)Y direction, and the boss portion 58a is inserted in the cam groove 69b and moves in the cam groove 69b, whereby the boss portion 58a is guided in a direction corresponding to the bending shape of the cam groove 69b.

A protruding malfunction prevention wall 69c is formed in the other end portion of the trigger plate 69 and outside the cam groove 69b. The malfunction prevention wall 69c performs the function of abutting against the boss portion 58a of the slide rack 58 to inhibit the movement of the trigger plate 69 in the (+)X direction when the optical pickup 57 is positioned closer to the inner region of the disk within the range of movement thereof during the recording or reproduction of information, that is, prior to a second switching operation.

A relay substrate 70 is mounted on the opposite side of the traverse chassis 51 from the disk tray 12. The relay substrate 70 is a substrate to which connection lines from the spindle motor 54 and the dual-purpose motor 62 are connected. The relay substrate 70 is provided with a first switch 71 for detecting the extended position of the disk tray 12 by using the displacement of the cam slider 15 to be described later, and the second switch 72 for detecting that the optical pickup 57 is positioned closer to the inner region of the disk or that the raising operation of the turntable 52 is completed by using the displacement of the switch pressing portion 57b of the optical pickup 57.

Figure 7:
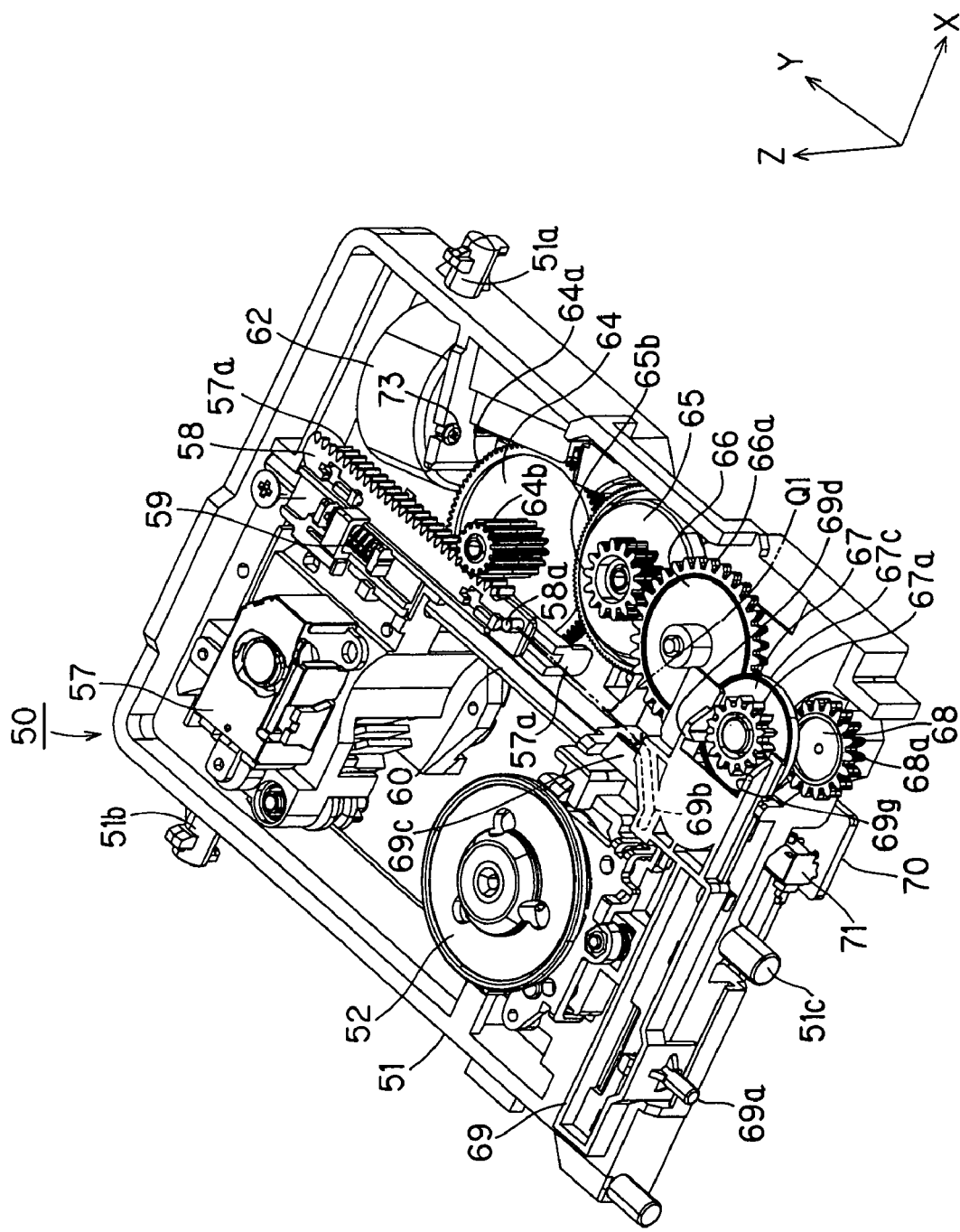
FIG. 7 is a perspective view showing the traverse unit with an optical pickup in a position of an outer region of an optical disk.

The pickup feed operation in the traverse unit 50 thus constructed will be first described. FIG. 7 is a perspective view showing the traverse unit 50 with the optical pickup in a position of the outer region of the optical disk during the pickup feed operation.

First, when the worm gear 63 is rotated by the rotatable driving force of the dual-purpose motor 62, the large gear portion 64a of the feed gear 64 is rotated in a direction depending on the rotation of the dual-purpose motor 62 by the worm gear 63. Because of the meshing engagement between the small gear portion 64b of the feed gear 64 and the rack portion 57a of the optical pickup 57, the rotation of the feed gear 64 is transmitted to the optical pickup 57 in the form of a driving force for moving the optical pickup 57 along the direction of the Y axis along the main shaft guide 60. Thus, the optical pickup 57 reciprocally moves along the Y axis in accordance with the direction of rotation of the dual-purpose motor 62. For example, for the reproduction operation, the optical pickup 57 moves to a predetermined position in which an information signal desired to be read is recorded on the optical disk, and reproduces the information signal. A mechanism including the rack portion 57a constitutes the pickup drive mechanism for reciprocally moving the optical pickup 57 between the inner region and the outer region of the optical disk.

In this operation, the slide rack 58 also reciprocally moves along the Y axis in the same direction as the optical pickup 57 because of the meshing engagement between the small gear portion 64b of the feed gear 64 and the slide rack 58.

This optical disk device 1 has the following advantage because the worm gear 63 is press-fitted on the rotation shaft of the dual-purpose motor 62 and the worm gear 63 is brought into meshing engagement with the large gear portion 64a of the feed gear 64 to rotate the feed gear 64.

Typically, a spur gear is often mounted on the rotation shaft of a motor serving as a drive source for the pickup feed operation. In this case, the spur gear of the rotation shaft will be brought into meshing engagement with another spur gear for the optical pickup feed operation.

However, in the case of a high-speed search for data on the optical disk, the rpm of the motor reaches thousands of revolutions per minute, and harsh rattle noise occurs due to tooth pitch error between the spur gear on the rotation shaft side of this motor and the spur gear in meshing engagement with the above-mentioned spur gear. Thus, measures are taken to suppress the above-mentioned rattle noise, for example, by using a relatively soft material such as nylon for the latter spur gear. However, the material such as nylon is very costly, and requires the cost of material about five times higher than that of, for example, polyacetal and the like which is most typically used as the material of a plastic gear.

The dual-purpose motor 62 of this optical disk device 1, on the other hand, reduces the tendency to cause the harsh rattle noise due to the tooth pitch error because the feed gear 64 meshing with the worm gear 63 is sufficiently decelerated down to about hundreds of revolutions per minute even if the rpm of the dual-purpose motor 62 reaches thousands of revolutions per minute during the search operation as described above. This provides the advantage of being able to achieve a very quiet pickup feed operation even by the use of a typical plastic material and the like, rather than the costly material such as nylon and the like, for the feed gear 64.

Next, a first switching operation for transition from the pickup feed operation to the turntable raising/lowering operation in the traverse unit 50 will be described.

Figure 8:
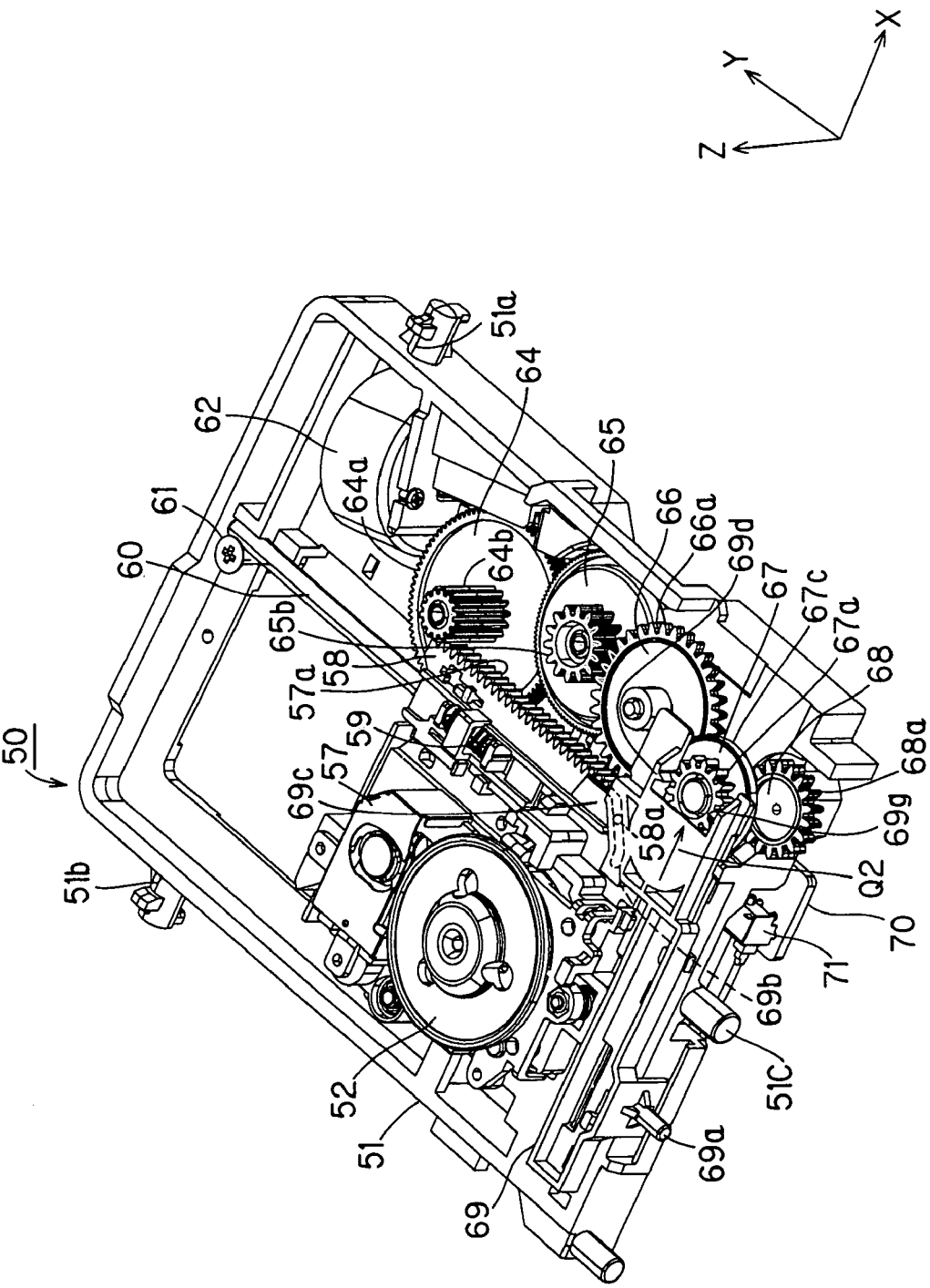
FIG. 8 is a perspective view showing the traverse unit with the optical pickup moved to an innermost position.
Figure 9:
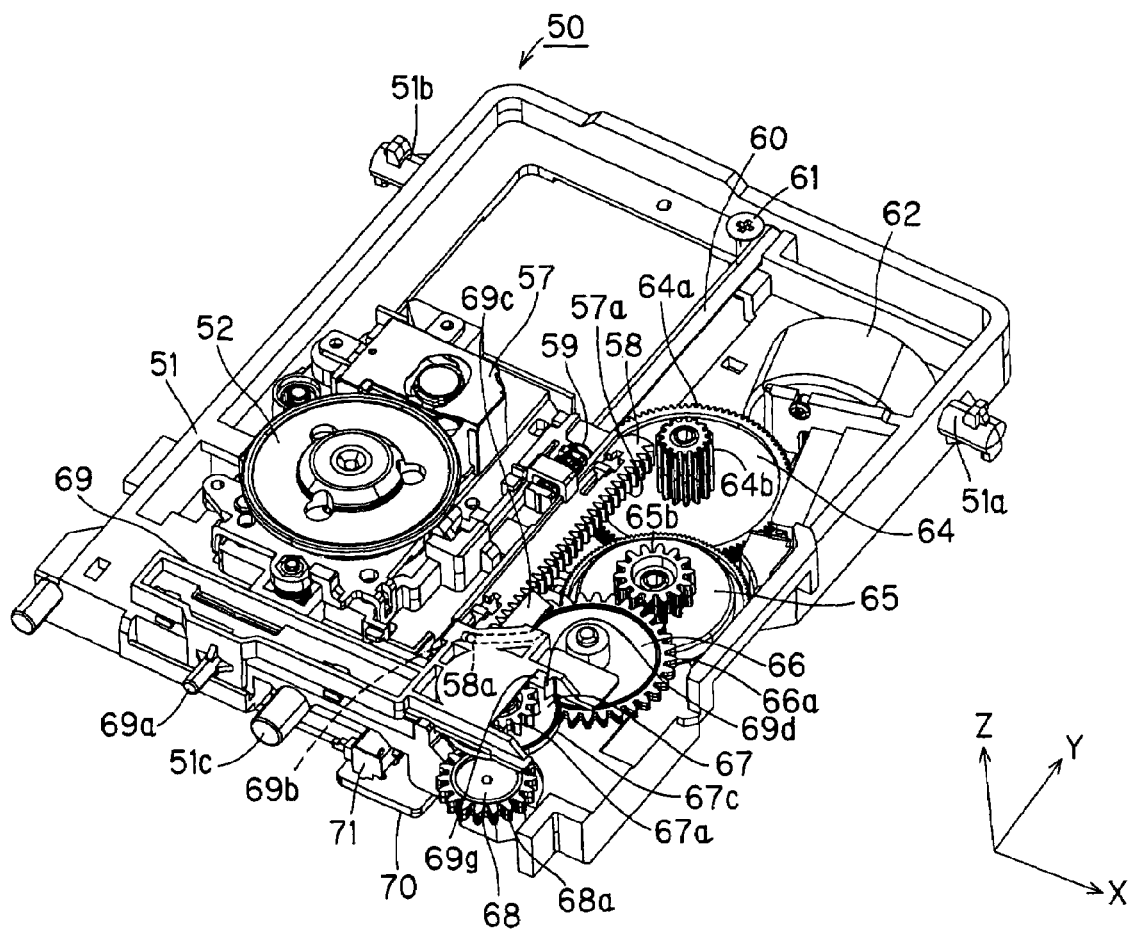
FIG. 9 is a perspective view showing the traverse unit with a slide rack moved further toward an inner region.

FIG. 8 is a perspective view showing the traverse unit 50 with the optical pickup 57 moved to the innermost position. FIG. 9 is a perspective view showing the traverse unit 50 with the slide rack 58 moved further in the (−)Y direction after the condition shown in FIG. 8.

When the optical pickup 57 is positioned in the outer region of the optical disk as shown in FIG. 7, the optical pickup 57 is moved in the (−)Y direction by the rotation of the dual-purpose motor 62, and moves to the inward position of the data area of the optical disk.

Thereafter, when the optical pickup 57 moves to the innermost position further in the (−)Y direction, the boss portion 58a of the slide rack 58 comes into engagement with the cam groove 69b of the trigger plate 69 in such a manner as to move into the cam groove 69b near the innermost position (see the arrow Q1 of FIG. 7). Thus, the trigger plate 69 becomes movable in the (+)X direction as the boss portion 58a moves in the (−)Y direction (see the arrow Q2 of FIG. 8).

With the optical pickup 57 reaching the inner end position of the operation stroke, the second switch 72 of the optical pickup 57 presses the switch pressing portion 57b, whereby it is detected that the optical pickup 57 is positioned in the inner end position of the operation stroke. At the same time, the meshing engagement between the rack portion 57a of the optical pickup 57 and the small gear portion 64b of the feed gear 64 is released, and a transition is made to the meshing engagement between the slide rack 58 and the small gear portion 64b. At the same time, the upper spur gear portion 67a of the third gear 67 is placed in the recessed portion 69g of the trigger plate 69.

In the subsequent operation, switching is done from the pickup feed operation to the turntable raising/lowering operation in the first switching operation.

As the dual-purpose motor 62 continues further rotating, only the slide rack 58 moves in the (−)Y direction against the urging force of the spring 59 because of the meshing engagement with the above-mentioned small gear portion 64b, with the optical pickup 57 placed in a fixed position, as shown in FIG. 9, since the optical pickup 57 is already positioned on the inner end of the operation stroke and the meshing engagement between the rack portion 57a of the optical pickup 57 and the small gear portion 64b of the feed gear 64 is released.

This movement of the slide rack 58 causes the boss portion 58a to exert a driving force on the cam groove 69b of the trigger plate 69, thereby moving the trigger plate 69 in the (+)X direction. The cam slider 15 to be described later operates in response to the movement of the trigger plate 69 to thereby start the raising/lowering operation of the turntable 52. The operation of the cam slider 15 will be detailed later.

In the course of the movement of the trigger plate 69 because of the meshing engagement between the small gear portion 64b of the feed gear 64 and the slide rack 58, the meshing engagement between the tooth portion 69d of the trigger plate 69 and the upper spur gear portion 67a of the third gear 67 is initiated (see FIG. 8). Subsequently, the trigger plate 69 is moved in the (+)X direction also by the meshing engagement between the tooth portion 69d on the trigger plate 69 side and the upper spur gear portion 67a of the third gear 67 (see the arrow Q2 of FIG. 8). That is, the trigger plate 69 in the course of the movement is moved in the (+)X direction both by the driving force transmitted from the feed gear 64 through the slide rack 58, the boss portion 58a and the cam groove 69b and the driving force transmitted from the third gear 67 through the upper spur gear portion 67a thereof and the tooth portion 69d.

In the course of the further movement of the trigger plate 69 in the (+)X direction, the meshing engagement between the slide rack 58 and the feed gear 64 is released. Then, the trigger plate 69 is moved in the (+)X direction by the driving force transmitted from the third gear 67 through the upper spur gear portion 67a thereof and the tooth portion 69d (see FIG. 9). The meshing engagement between the tooth portion 69d and the third gear 67 is also released just before the trigger plate 69 further moved in the (+)X direction reaches the end thereof. The subsequent operation will be described later.

Components including the above-mentioned slide rack 58 and the trigger plate 69 constitute a first operation switching mechanism.

It should be noted that the speed at which the slide rack 58 moves the trigger plate 69 by means of the engagement between the boss portion 58a and the cam groove 69b and the speed of the upper spur gear portion 67a of the third gear 67 on a pitch circle (in other words, the speed at which the third gear 67 moves the trigger plate 69) are designed to be substantially the same. The intermittent meshing engagement between the tooth portion 69d of the trigger plate 69 and the above-mentioned third gear 67 is effected smoothly in accordance with the speed of movement caused by the driving force transmitted from the feed gear 64 through the slide rack 58, the boss portion 58a and the cam groove 69b.

The switching operation for transition from the turntable raising/lowering operation to the pickup feed operation in the traverse unit 50 is performed by reversing the above-mentioned operation.

<Description about Loading Unit>

Next, the construction of the loading unit 10 will be described in further detail. FIG. 10 is an exploded perspective view showing this optical disk device. This loading unit 10 comprises the main chassis 11, the disk tray 12, the cam slider 15, and the clamper 18.

Figure 11:
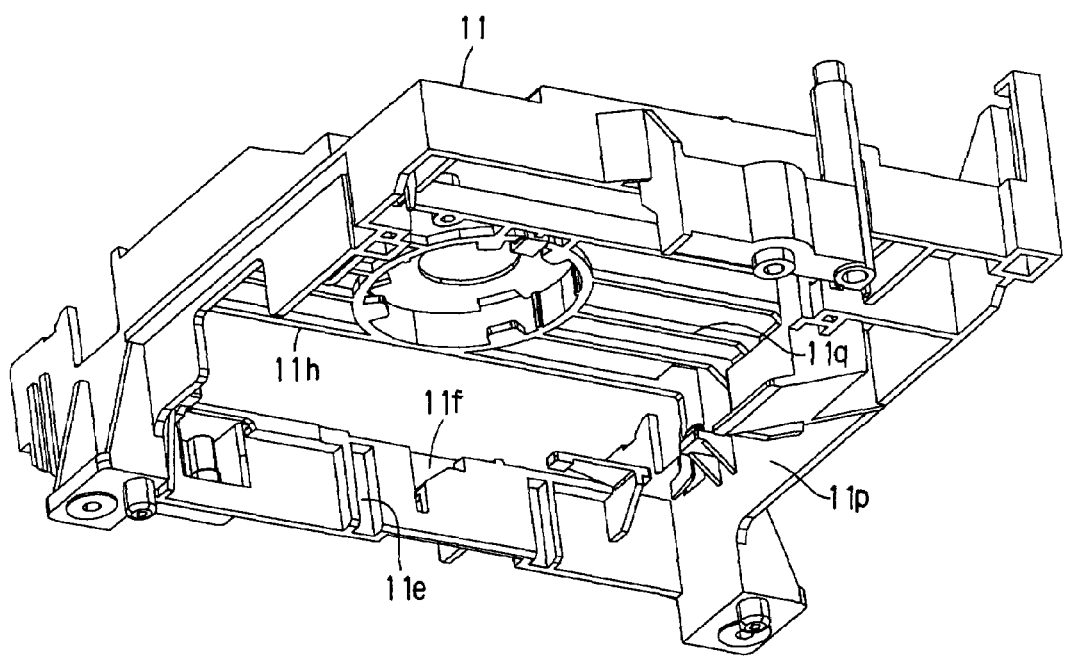
FIG. 11 is a perspective view showing a main chassis.
Figure 11:
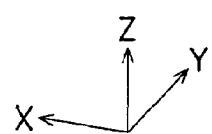

The main chassis 11 is a component serving as a base body of the optical disk device 1 or the loading unit 10. FIG. 11 is a perspective rear view showing the main chassis as viewed from below in an oblique direction.

A portion of the rectangular frame element 11p of the main chassis 11 which is opposed to an end surface of the traverse unit 50 toward which the tray is extended (in the (−)Y direction) is formed with a guide groove 11e engageable with the driven boss portion 51c of the traverse chassis 51, and the guide groove 11f engageable with the boss portion 69a of the trigger plate 69. The pivot side end portion of the traverse chassis 51 is moved and guided by the movement of the driven boss portion 51c in the guide groove 11e. The trigger plate 69 is guided by the movement of the boss portion 69a in the guide groove 11f.

The one main surface of the disk tray 12 is formed with the recessed receiving tray portion 12f for holding the optical disk in a predetermined position, and the other main surface thereof is formed with a rack portion 12a and a tray guide groove extending along the directions in which the disk tray 12 is extended and retracted (in the directions of the Y axis) (see FIG. 2). The disk tray performs the operation of reciprocally moving along the directions of the Y axis with respect to the main chassis 11 to store and eject the optical disk by means of a disk tray carrying-out mechanism including the rack portion 12a.

The above-mentioned tray guide groove is constructed to include a first guide groove 12b provided in an end portion toward which the disk tray 12 is extended ((−)Y direction side end portion), a third guide groove 12d extending from the end portion toward which the disk tray 12 is extended to an end portion toward which the disk tray 12 is retracted ((+)Y direction side end portion), a second guide groove 12c provided between the first guide groove 12b and the third guide groove 12d, and a fourth guide groove 12e provided in the end portion toward which the disk tray 12 is retracted, the first to fourth guide grooves 12b to 12e being provided continuously and integrally (see FIG. 2). The above-mentioned first guide groove 12b extends along a direction orthogonal to the directions in which the disk tray 12 is extended and retracted, and the third guide groove 12d extends along the above-mentioned directions in which the disk tray 12 is extended and retracted. The second guide groove 12c extends between the above-mentioned first guide groove 12b and the third guide groove 12d along a direction angled with respect to the above-mentioned directions in which the disk tray 12 is extended and retracted.

The tray gear 13 is rotatably supported by a supporting shaft portion 14 in one side portion of the end portion of the main chassis 11 toward which the disk tray 12 is extended (in the (−)Y direction). The tray gear 13 has a small gear portion 13b always meshing with the fourth gear 68 on the traverse unit 50, and a large gear portion 13a intermittently meshing with the rack portion 12a formed on the disk tray 12 side. Whether the small gear portion 13b and the large gear portion 13a are large or small means whether the pitch circle radii thereof are large or small. That is, the pitch circle radius of the small gear portion 13b is smaller than the pitch circle radius of the large gear portion 13a. The number of teeth of the large gear portion 13a and the number of teeth of the small gear portion 13b are equal to each other.

The above-mentioned disk tray 12 is incorporated in the main chassis 11 so as to be able to be extended out of or retracted into the main chassis 11 through the opening 11h of the main chassis 11, with the rack portion 12a in meshing engagement with the large gear portion 13a of the tray gear 13.

Figure 12:
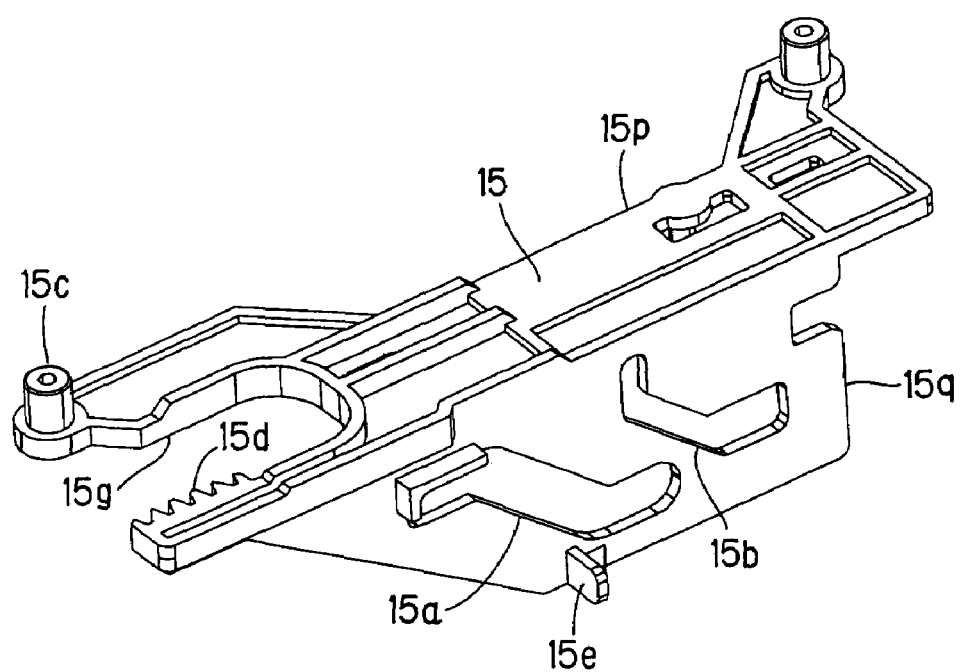
FIG. 12 is a perspective view showing a cam slider.

The cam slider 15 is supported in the end portion of the main chassis 11 toward which the tray is extended (in the (−)Y direction) for reciprocal movement along directions (directions of the X axis) orthogonal to the directions in which the disk tray 12 is extended and retracted. FIG. 12 is a perspective view showing the cam slider 15.

The cam slider 15 has a substantially L-shaped configuration such that a second piece 15q of a substantially plate-like shape is extensionally provided on one side portion of a first piece 15p of a substantially elongated plate-like shape.

The second piece 15q is formed with the first cam groove 15a for engagement with the driven boss portion 51c of the traverse chassis 51, and a second cam groove 15b for engagement with the boss portion 69a of the trigger plate 69. The first cam groove 15a and the second cam groove 15b each have an inclined groove portion extending gradually away from the first piece 15p (or extending gradually away from the disk tray 12 when incorporated in the main chassis 11) in a direction from one end to the other end of the cam slider 15 (in the (−)X direction).

The second piece 15q is formed with a protruding switch pressing portion 15e for pressing the first switch 71 on the traverse chassis 51 in accordance with the movement along the direction of the X axis.

One end portion of the first piece 15p, on the other hand, is formed with a groove portion 15g of a substantially U-shaped configuration capable of receiving the small gear portion 13b of the tray gear 13 therein, and a rack portion 15d provided in a forward end portion of an inner peripheral side portion of the groove portion 15g for intermittently meshing with the small gear portion 13b of the tray gear 13. The rack portion 15d is not formed in an inner portion of the groove portion 15g. Thus, the small gear portion 13b is adapted for meshing engagement with the rack portion 15d in the forward end portion of the groove portion 15g, and is adapted to rotate freely without meshing engagement with the rack portion 15d in the inner portion of the groove portion 15g.

The one end portion of the first piece 15p is formed with a protruding boss portion 15c for sequential engagement with the guide grooves 12b, 12c, 12d, 12e of the disk tray 12.

This cam slider 15 is supported on the end portion of the main chassis 11 toward which the tray is extended for reciprocal movement along the directions of the X axis, with the small gear portion 13b of the tray gear 13 received in the groove portion 15g and the boss portion 15c inserted and received in the guide grooves 12b, 12c, 12d, 12e of the disk tray 12.

A torsion spring 16 serving as an urging member is attached to the end portion of the main chassis 11 toward which the tray is extended. One end of the torsion spring 16 is fixed to the main chassis 11, and the other end thereof is fixed to the cam slider 15 (see FIGS. 15 to 17). The urging force of the torsion spring 16 enables the cam slider 15 to hold its position at the start and end of the operation stroke in the (+)X direction.

A hole portion is formed substantially in the center of the bridge piece 11q of the main chassis 11, and the clamper 18 is mounted substantially in the center of a main surface the bridge piece 11q on the disk tray 12 side. The clamper 18 is mounted in a position out of the path of the extending and retracting movements of the disk tray 12 so as not to interfere with the disk tray 12 during the extending and retracting movements of the disk tray 12. The magnet 17 is contained inside the clamper 18, and optical disk is held between the clamper 18 and the turntable 52 by the force of attraction of the magnet 17.

The above-mentioned traverse unit 50 when assembled to the loading unit 10 is in the following condition.

The pair of rotation shafts 51a and 51b of the traverse chassis 51 are rotatably supported by the pair of bearing portions (composed of the shaft supporting portions 11a, 11b and the shaft holding portions 11c, 11d) on the main chassis 11 side, whereby the traverse chassis 51 is supported pivotably with respect to the main chassis 11.

The fourth gear 68 is in meshing engagement with the small gear portion 13b of the tray gear 13. This causes the disk tray 12 to make the extending and retracting movements with respect to the main chassis 11 in accordance with the rotation of the fourth gear 68.

The driven boss portion 51c of the traverse chassis 51 is in engagement with the first cam groove 15a of the cam slider 15. This causes the traverse chassis 51 to pivot between a position in which the traverse chassis 51 is close to the disk tray 12 (a position in which the traverse chassis 51 is substantially parallel to the disk tray 12 or a turntable raised position) and a position in which the traverse chassis 51 is remote from the disk tray 12 (an inclined position in which the end portion of the traverse chassis 51 toward which the disk tray 12 is extended is remote or a turntable lowered position) in accordance with the movement of the cam slider 15 in the X direction.

The boss portion 69a of the trigger plate 69 is in engagement with the second cam groove 15b of the cam slider 15. This causes the cam slider 15 to reciprocally move in the directions of the X axis in accordance with the movement of the trigger plate 69 in the directions of the Y axis.

Next, the turntable raising/lowering operation will be described.

As described above, the turntable raising/lowering operation is performed at the time that the slide rack 58 starts moving the trigger plate 69.

Figure 13:
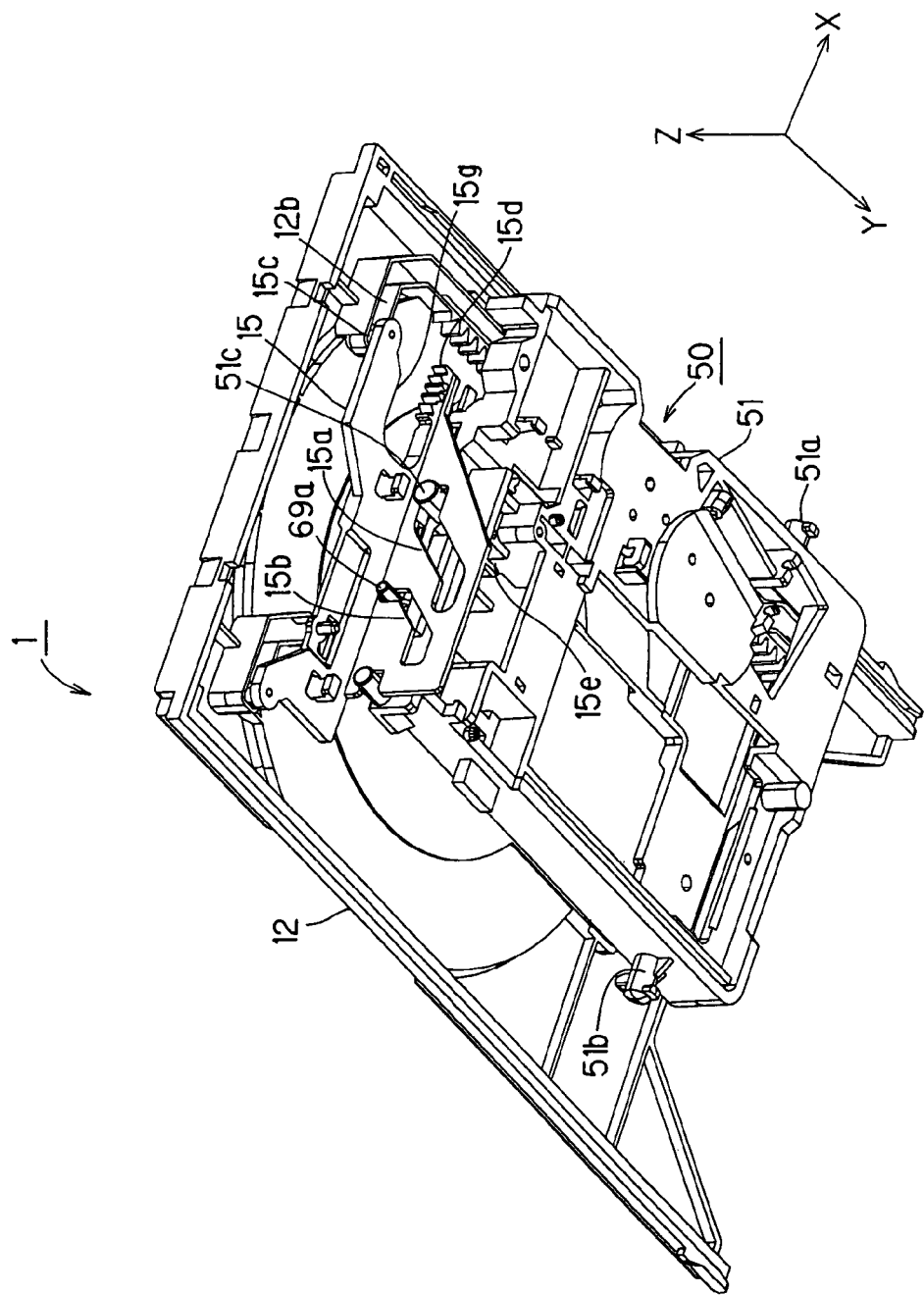
FIG. 13 is a perspective view showing a positional relationship between principal parts of the optical disk device with a turntable in an raised position.

FIG. 13 is a perspective view showing a positional relationship between principal parts of the optical disk device with the turntable in its raised position. FIG. 14 is a perspective view showing a positional relationship between the principal parts of the optical disk device with the turntable in its lowered position.

Specifically, immediately before the start of the movement of the trigger plate 69, the boss portion 69a of the trigger plate 69 is positioned in a vertical groove portion (an end on the disk tray 12 side) of the second cam groove 15b of the cam slider 15, and the driven boss portion 51c of the traverse chassis 51 is positioned in an upper horizontal groove portion (an end on the disk tray 12 side) of the first cam groove 15a of the cam slider 15. This causes the traverse unit 50 to maintain a substantially horizontal position with respect to the disk tray 12, that is, causes the turntable 52 to maintain the raised position.

In this condition, the cam slider 15 is urged in the (−)X direction by the torsion spring 16, and is positioned on the side of the (−)X direction within its movable range. Therefore, the small gear portion (not shown) of the tray gear 13 is outside the groove portion 15g of the cam slider 15, and the rack portion 15d of the cam slider 15 is not in meshing engagement with the small gear portion of the tray gear 13.

When the trigger plate 69 in this condition moves in the (+)X direction, the boss portion 69a of the trigger plate 69 transmits a force to the vertical groove portion of the second cam groove 15b of the cam slider 15, and the cam slider 15 under this force moves similarly in the (+)X direction. As the cam slider 15 moves further, the rack portion 15d of the cam slider 15 comes into meshing engagement with the small gear portion of the tray gear 13, and the cam slider 15 moves in the (+)X direction for a while under the driving forces from both the trigger plate 69 and the tray gear 13.

After the trigger plate 69 moves in the (+)X direction and the meshing engagement between the tooth portion 69d of the trigger plate 69 and the upper spur gear portion 67a of the third gear 67 is released (see FIG. 9), the cam slider 15 is moved in the (+)X direction by the driving force through the tray gear 13. This movement of the cam slider 15 in the (+)X direction causes the driven boss portion 51c of the traverse chassis 51 to be guided in a slant of the first cam groove 15a of the cam slider 15 in a direction away from the disk tray 12. This causes the traverse chassis 51 to pivot about the rotation shafts 51a and 51b in a direction away from the disk tray 12, thereby moving the turntable 52 to the lowered position.

Components including the above-mentioned driven boss portion 51c and the cam slider 15 constitute the turntable raising/lowering mechanism.

Principal parts of the above-mentioned operation will be described in further detail.

The traverse chassis 51 does not pivot while the driven boss portion 51c of the traverse chassis 51 is placed in the upper horizontal groove (the end on the disk tray 12 side) of the first cam groove 15a of the cam slider and the driven boss portion 51c moves the cam slider 15 in the (+)X direction within the upper horizontal groove of the first cam groove 15a. This allows the rack portion 15d of the cam slider 15 and the small gear portion of the tray gear 13 to come into meshing engagement at relatively low load in the early stage of the meshing engagement. During this interval, the boss portion 69a of the trigger plate 69 moves within a horizontal groove portion (an end portion on the disk tray 12 side) of the guide groove 11f of the main chassis 11.

Next, the traverse chassis 51 starts pivoting about the rotation shaft 51a and 51b in the stage wherein the rack portion 15d of the cam slider 15 and the small gear portion of the tray gear 13 are in fully meshing engagement with each other and the driven boss portion 51c of the traverse chassis 51 moves within the slant groove portion which is an intermediate portion of the first cam groove 15a of the cam slider 15. This causes the turntable 52 to start lowering against the force of attraction from the clamper 18 side.

During this interval, the boss portion 69a of the trigger plate 69 is first moved within a slant groove portion which is an intermediate portion of the guide groove 11f of the main chassis 11 by the movement of the cam slider 15 in the (+)X direction and the movement of the traverse chassis 51 in the (−)Z direction. Then, the boss portion 69a of the trigger plate 69 moves in a vertical groove portion of the guide groove 11f of the main chassis 11 (see FIG. 11) at a position wherein the meshing engagement between the trigger plate 69 and the upper spur gear portion of the third gear 67 is released (see FIG. 9). Therefore, after the position wherein the meshing engagement between the trigger plate 69 and the upper spur gear portion 67a of the third gear 67 is released, the cam slider 15 moves in the (+)X direction, but the boss portion 69a of the trigger plate moves in the vertical groove portion of the guide groove 11f of the main chassis 11, whereby the trigger plate 69 and the upper spur gear portion of the third gear 67 are maintained out of meshing engagement with each other as shown in FIG. 9.

The switching from the turntable raising/lowering operation to a pickup transport operation is done by reversing these operations.

Next, the operation of a second operation switching mechanism during a transition from the turntable raising/lowering operation to the disk transport operation will be described.

Figure 15:
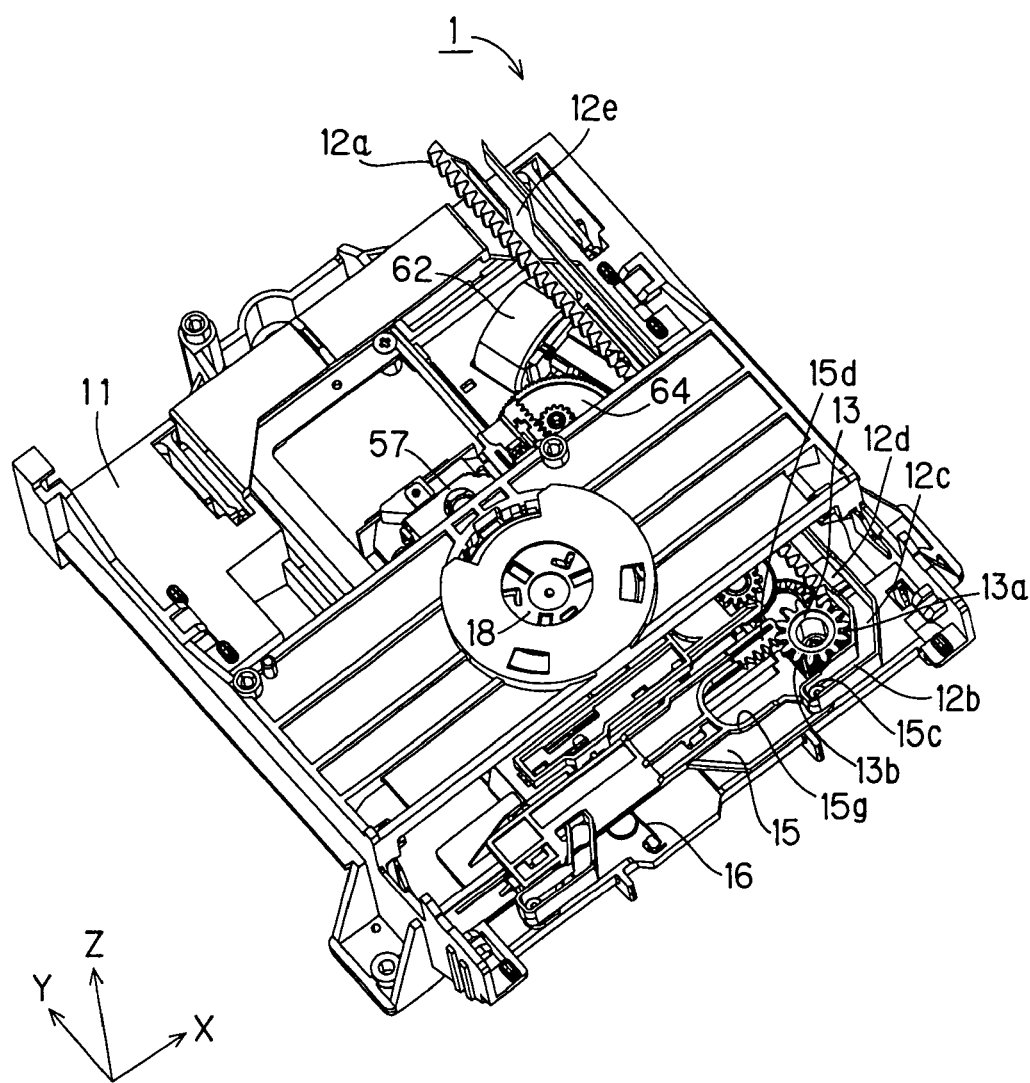
FIG. 15 is a perspective view showing the optical disk device in a condition before second operation switching.
Figure 16:
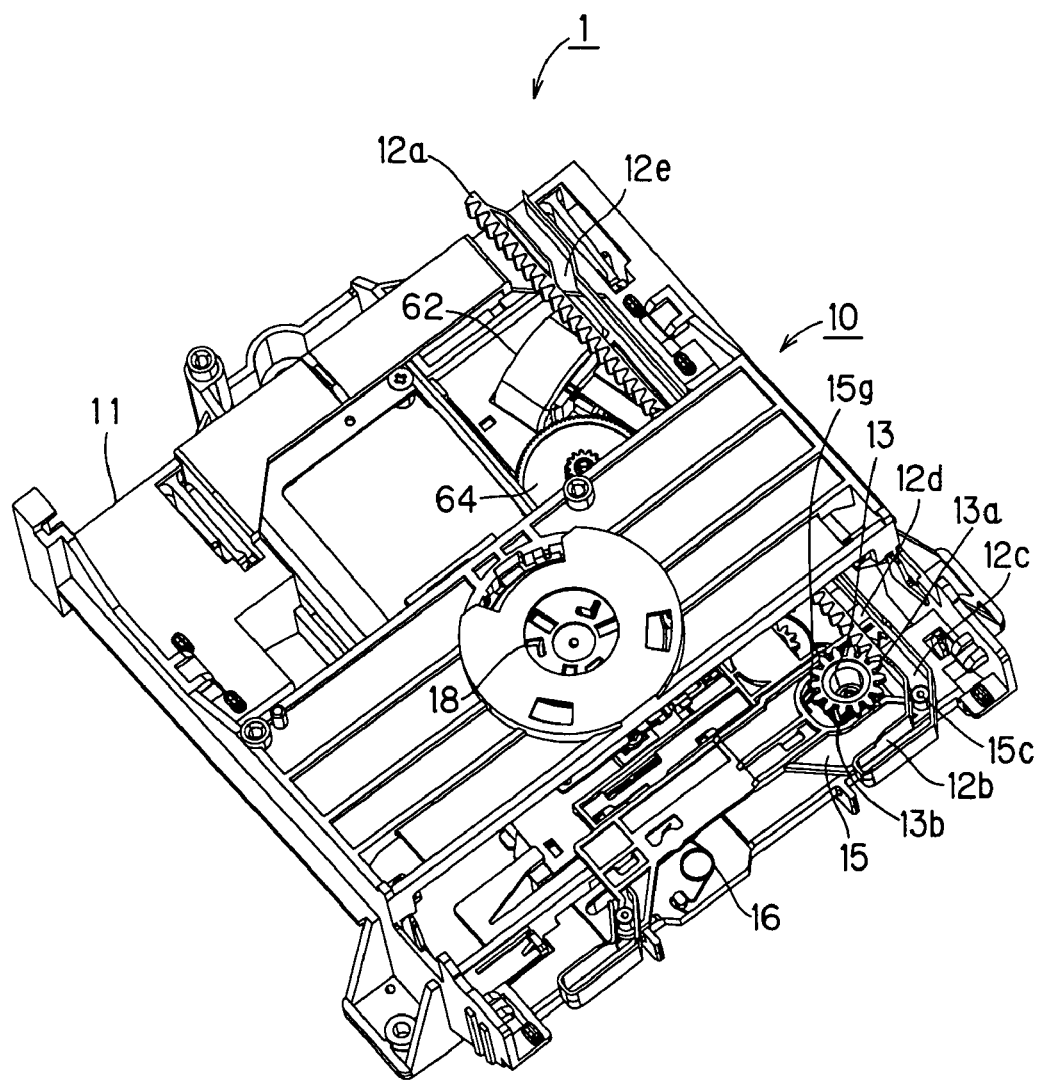
FIG. 16 is a perspective view showing the optical disk device in a condition after the second operation switching.
Figure 17:
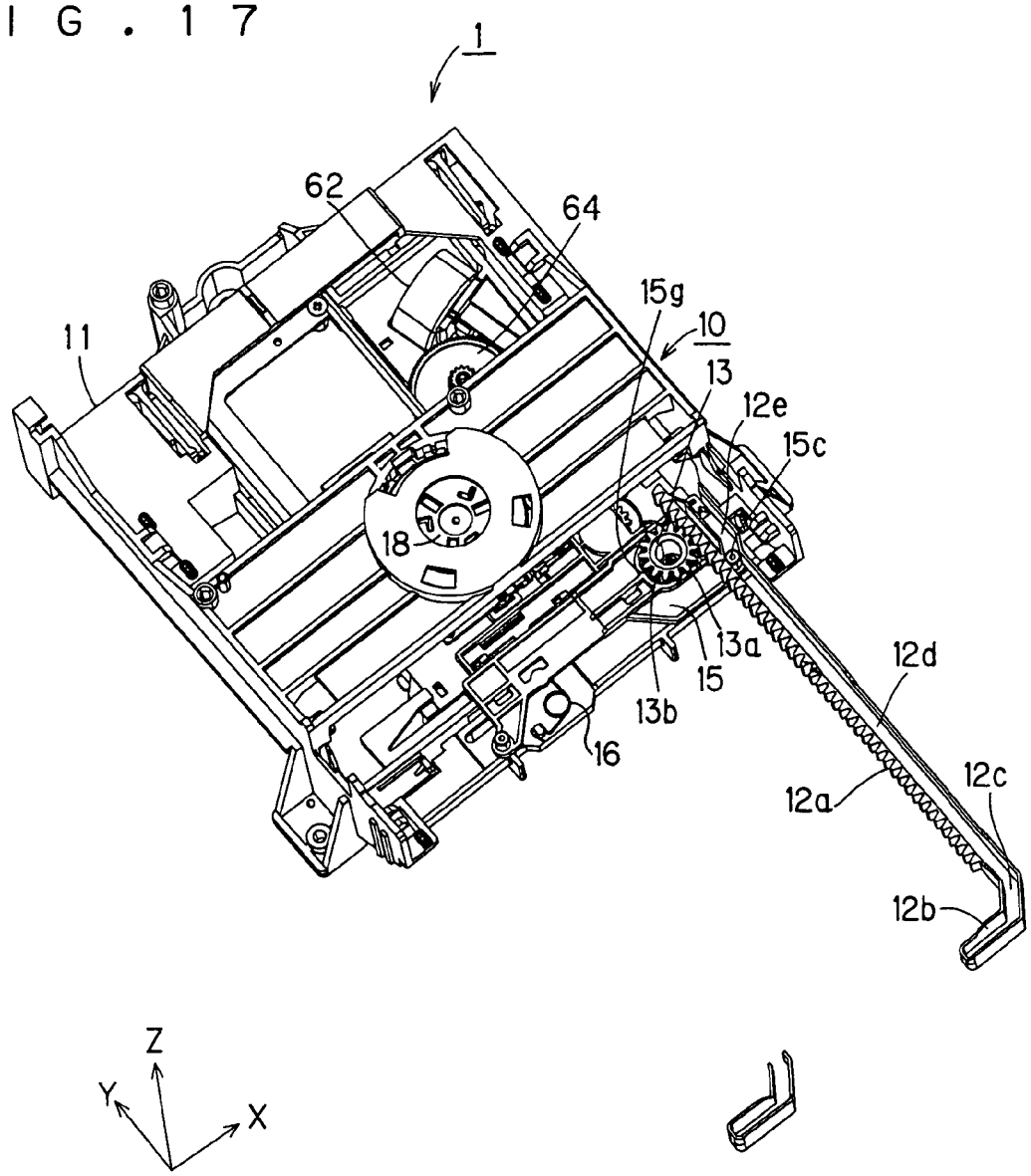
FIG. 17 is a perspective view showing the optical disk device during the operation of extending the disk tray.

FIG. 15 is a perspective view showing the optical disk device in a condition before second operation switching. FIG. 16 is a perspective view showing the optical disk device in a condition after the second operation switching. FIG. 17 is a perspective view showing the optical disk device during the operation of extending the disk tray. For ease of understanding, the tray 12 is shown in FIGS. 15 and 16 using only the rack portion 12a and the guide grooves 12b, 12c, 12d and 12e.

When the turntable 52 is in the raised position, the cam slider 15 is positioned on the end of its operation stroke range toward the (−)X direction, and is urged in the direction of the (−)X axis by the torsion spring 16. The boss portion 15c of the cam slider 15 is in engagement with the guide groove 12b of the tray 12. This prevents the disk tray 12 from bursting out in the (−)Y direction by an external force and the like.

In this condition, the large gear portion 13a of the tray gear 13 is not in meshing engagement with the rack portion 12a of the tray 12.

When the lowering operation in the raising/lowering operation of the turntable 52 starts, the cam slider 15 is moved in the (+)X direction in response to the operation of the trigger plate 69, and the rack portion 15d of the cam slider 15 first comes into meshing engagement with the small gear portion 13b of the tray gear 13. After this meshing engagement, the rotation of the small gear portion 13b of the tray gear 13 moves the cam slider 15 further in the (+)X direction. In response to the movement of the cam slider 15, the boss portion 15c of the cam slider 15 moves in the (+)X direction from the guide groove 12b to the guide groove 12c. When the boss portion 15c reaches the guide groove 12c angled with respect to the X axis and moves within the guide groove 12c, the movement of the boss portion 15c in the (+)X direction is transformed into a force for moving the disk tray 12 in the (−)Y direction. This moves the disk tray 12 to extend a predetermined amount out of the main chassis 11, thereby bringing the rack portion 12a of the tray 12 into meshing engagement with the large gear portion 13a of the tray gear 13. Thereafter, the second operation switching is completed by the release of the meshing engagement between the rack portion 15d of the cam slider 15 and the small gear portion 13b of the tray gear 13.

That is, such a configuration that the above-mentioned boss portion 15c moves in the guide grooves 12b, 12c and 12d achieves the function as the second operation switching mechanism.

The switching operation from the disk transport operation to the turntable raising/lowering operation is performed by reversing the above-mentioned operations.

After the completion of the above-mentioned second operation switching, the operation of extending the disk tray 12 (the operation of ejecting the tray), that is, the transport operation of the optical disk is performed by the meshing engagement between the rack portion 12a and the large gear portion 13a of the tray gear 13.

During the interval that the boss portion 15c is engaged and guided by the guide groove 12d of the tray 12 in the operation of extending the disk tray 12, as shown in FIG. 17, the position of the cam slider 15 in the direction of the X axis is restricted and the cam slider 15 is urged in the direction of the (+)X axis by the torsion spring 16. In a position immediately short of the completion of the ejection of the disk tray 12, the boss portion 15c of the cam slider 15 is moved in the (+)X direction by the guide groove 12e of the tray 12. This movement causes the switch pressing portion 15e of the cam slider 15 to press the first switch 71 on the traverse chassis 51, whereby the ejection position of the tray 12 is detected and the rotation of the dual-purpose motor 62 is stopped.

In the above-mentioned second operation switching operation, it is necessary to prevent a situation wherein a shift occurs in the positions of the cam slider 15 and the rack portion 12a of the disk tray 12 relative to each other. That is, in a position wherein the meshing engagement between the large gear portion 13a of the tray gear 13 and the rack portion 12a of the disk tray 12 is initiated, the cam slider 15 is required to have been moved to a predetermined position wherein the meshing engagement between the rack portion 15d of the cam slider 15 and the small gear portion 13b of the tray gear 13 is releasable. If the cam slider 15 has not yet reached the above-mentioned predetermined position or has been beyond the predetermined position in the position wherein the meshing engagement between the large gear portion of the tray gear 13 and the rack portion 12a of the tray 12 is initiated, the above-mentioned second operation switching operation does not normally operates due to the interference between the boss portion 15c and the guide grooves 12c, 12d and the like.

Therefore, the phases of the small gear portion 13b of the tray gear 13 for driving the cam slider 15 and the large gear portion 13a of the tray gear 13 for driving the disk tray 12 must not be in an arbitrary relationship. In this embodiment, the large gear portion 13a and the small gear portion 13b of the tray gear 13 are equal in the number of teeth to each other and differ in tooth module from each other. Therefore, there are no changes in the phases of the large gear portion 13a and the small gear portion 13b. No relative position shift occurs between the cam slider 15 and the rack portion 12a of the disk tray 12 in each second switching operation. The second operation switching always operates normally.

On the other hand, the raising/lowering operation of the turntable is performed relatively slowly because the cam slider 15 is driven by the small gear portion 13b of the tray gear 13. Therefore, the raising/lowering operation of the turntable which is prone to unusual noise can be performed quietly. The disk transport operation, on the other hand, is performed relatively at high speed because the disk tray 12 is driven by the large gear portion 13a.

Next, operation until the reproduction of the information signal on the optical disk after the storage of the disk tray 12 within the device 1 will be described.

Specifically, the dual-purpose motor 62 rotates in a direction opposite from the direction of rotation made during the above-mentioned disk carrying-out operation, and the disk tray 12 is stored into the device 1 by the disk transport mechanism.

The cam slider 15 moves in response to the disk tray 12 reaching a predetermined position in the device 1 to release the meshing engagement between the large gear portion 13a of the tray gear 13 and the rack portion 12a of the tray 12, and the cam slider 15 moves to bring the small gear portion 13b of the tray gear 13 into meshing engagement with the rack portion 15d. This completes the second switching operation.

Thereafter, the driving force of the dual-purpose motor 62 is transmitted from the tray gear 13 through the cam slider 15 and the driven boss portion 51c as a force for raising the turntable 52, thereby to raise the turntable 52. When the optical disk is lifted from the disk tray 12 by raising the turntable 52, the optical disk is held between the turntable 52 and the clamper 18 by the force of attraction due to the magnetic force of the clamper 18.

When the above-mentioned cam slider 15 continues moving further, the meshing engagement between the rack portion 15d of the cam slider 15 and the small gear portion 13b of the tray gear 13 is released in response thereto, and the slide rack 58 moves to come into meshing engagement with the small gear portion 64b of the feed gear 64 (the first switching operation). This causes the driving force of the dual-purpose motor 62 to be transmitted from the feed gear 64 through the slide rack 58 as a force for moving the optical pickup 57. This makes the optical pickup 57 movable in the direction toward the outer region of the optical disk.

When the optical pickup 57 moves a predetermined amount toward the outer region of the optical disk, the pressing of the second switch 72 by the switch pressing portion 57b of the optical pickup is released, and it is detected that the optical pickup 57 has been moved to a position closer to the outer region than the inner end of the operation stroke. After this detection condition, the optical pickup 57 can reproduce the information signal on the disk, and the rotation of the dual-purpose motor 62 is temporarily stopped in this position.

Then, the optical disk is rotated at a predetermined rpm by the spindle motor 54 directly coupled to the turntable 52, and the optical pickup 57 is moved by the pickup drive mechanism in a radial direction of the disk toward a position where desired data is present, to reproduce the information signal on the optical disk.

After the optical disk is stored, the position in which the optical pickup 57 first reads the information signal is a pressing release position in which the pressing of the second switch 72 by the switch pressing portion 57b of the optical pickup 57 is released. This pressing release position is outside, preferably slightly outside, of the innermost of the data area. After reading positional information on the optical disk in the pressing release position, the optical pickup 57 is moved once to the innermost position of the data area on the optical disk, based on the positional information. The optical pickup 57 moves on the optical disk with respect to this innermost position to reproduce the information signal in any position on the optical disk.

<Operation During Power-On and -Off of Optical Disk Device>

Next, operation during power-on and -off of this optical disk device will be described. When, for example, a system with this optical disk device 1 incorporated therein is powered off after the completion of the reproduction of the information signal, a power-off signal is provided to a controller of this optical disk device. This rotatably drives the dual-purpose motor 62 to cause the optical pickup drive mechanism to move the optical pickup 57 to a position where the second switch 72 is pressed by the switch pressing portion 57b. Thereafter, this optical disk device is also powered off.

On the other hand, when the system with this optical disk device 1 incorporated therein is powered on, a power-on signal is provided to a drive controller 82 (to be described later) of this optical disk device 1. Thus, the drive controller 82 rotatably drives the dual-purpose motor 62 to cause the optical pickup drive mechanism to move the optical pickup 57 to the pressing release position where the pressing of the second switch 72 by the switch pressing portion 57b is released. The optical pickup 57 reads the positional information on the optical disk in this pressing release position, and is thereafter moved to the innermost position of the data area, based on the positional information. The optical pickup 57 moves on the optical disk with reference to the innermost position after the movement to reproduce the information signal on the optical disk.

If the second switch 72 is not pressed by the switch pressing portion 57*b* of the optical pickup 57 when the power-on signal is provided to this optical disk device, the drive controller 82 causes the pickup drive mechanism to instantaneously drives the optical pickup 57 to the outer region of the optical disk, and then moves the optical pickup 57 to the position where the second switch 72 is pressed by the switch pressing portion 57*b*. Then, the pickup drive mechanism moves the optical pickup 57 to the pressing release position where the pressing of the second switch 72 by the switch pressing portion 57*b* is released, and causes the optical pickup 57 to read the positional information on the disk in this position. Thereafter, the optical pickup 57 is moved to the innermost position of the data area, based on the positional information, to reproduce the information signal on the disk with reference to the innermost position after the movement.

As discussed above, the optical pickup 57 is once moved to the outer region of the optical disk if the second switch 72 is not pressed by the switch pressing portion 57*b* of the optical pickup 57. This is to prevent the simultaneous execution of the feed operation of the optical pickup 57 and the lowering operation of the turntable 52, thereby increasing the reliability of the operation.

Specifically, the condition wherein the second switch 72 is not pressed by the switch pressing portion 57*b* of the optical pickup p57 refers to a condition wherein the optical pickup is on the data area of the optical disk and is positioned to be able to reproduce the information signal of the optical disk. It is assumed that, in this condition, the small gear portion 13*b* of the tray gear 13 and the rack portion 15*d* of the cam slider 15 become meshingly engageable with each other for some reason. If, in this condition, the dual-purpose motor 62 rotates to drive the optical pickup 57 toward the inner region of the optical disk, the lowering operation of the turntable 52 is performed at the same time by the rotation of the dual-purpose motor 62, whereby the normal operation of the optical disk device is not achieved.

Even in such a condition, however, instantaneously driving the optical pickup 57 once toward the outer region as described above causes the tooth portion 69*d* of the trigger plate 69 to move at high speed in such a manner as to be kicked by the third gear 67. Thus, the cam slider 15 operating in response to the trigger plate 69 is moved from the position wherein the small gear portion 13*b* of the tray gear 13 and the rack portion 15*d* of the cam slider 15 is meshingly engageable to an original position wherein they are not meshingly engageable, and also is urged by the torsion spring 16 toward the position wherein they are not meshingly engageable. Therefore, the feed operation of the optical pickup 57 and the lowering operation of the turntable 52 are not performed at the same time, which increases the reliability of the operation.

<Operation under Application of External Force to Optical Disk Device>

Next, operation will be described, for example, when this optical disk device is subject to an external force such as a vibration, an impact and the like during the transportation of a system with this optical disk device 1 incorporated therein.

Typically, the system with this optical disk device 1 incorporated therein is packed and transported, with the disk tray 12 stored in the device 1 and the second switch 72 pressed by the switch pressing portion 57*b* of the optical pickup 57.

In this case, it is conceivable that a force will act to move the cam slider 15 to the position where the small gear portion of the tray gear 13 and the rack portion 15*d* of the cam slider 15 are meshingly engageable because of a vibration and an impact during the transportation. In this case, a disadvantage results such that the feed operation of the optical pickup 57 and the lowering operation of the turntable 52 are performed at the same time as described above.

In this optical disk device 1, however, the cam slider 15 is urged by the torsion spring 16 so as to be held in the original position (wherein the small gear portion 13*b* of the tray gear 13 and the rack portion 15*d* of the cam slider 15 are not in meshing engagement with each other). The above-mentioned disadvantage is prevented.

Further, in this optical disk device 1, while the second switch 72 is pressed by the switch pressing portion 57*b* of the optical pickup 57, the malfunction prevention wall 69*c* abuts against the boss portion 58*a* of the slide rack 58 to inhibit the movement of the slide rack 58, and the cam slider 15 is inhibited from moving in a direction wherein the small gear portion 13*b* of the tray gear 13 and the rack portion 15*d* of the cam slider 15 is meshingly engageable. Therefore, the above-mentioned simultaneous execution of the feed operation of the optical pickup 57 and the lowering operation of the turntable 52 is prevented.

<Connection and Construction of Electrical Components in Optical Disk Device>

This optical disk device 1 comprises the spindle motor 54, the dual-purpose motor 62, the first switch 71, the second switch 72 and the relay substrate 70 in addition to the optical pickup 57 as electrical components thereof.

Figure 18:
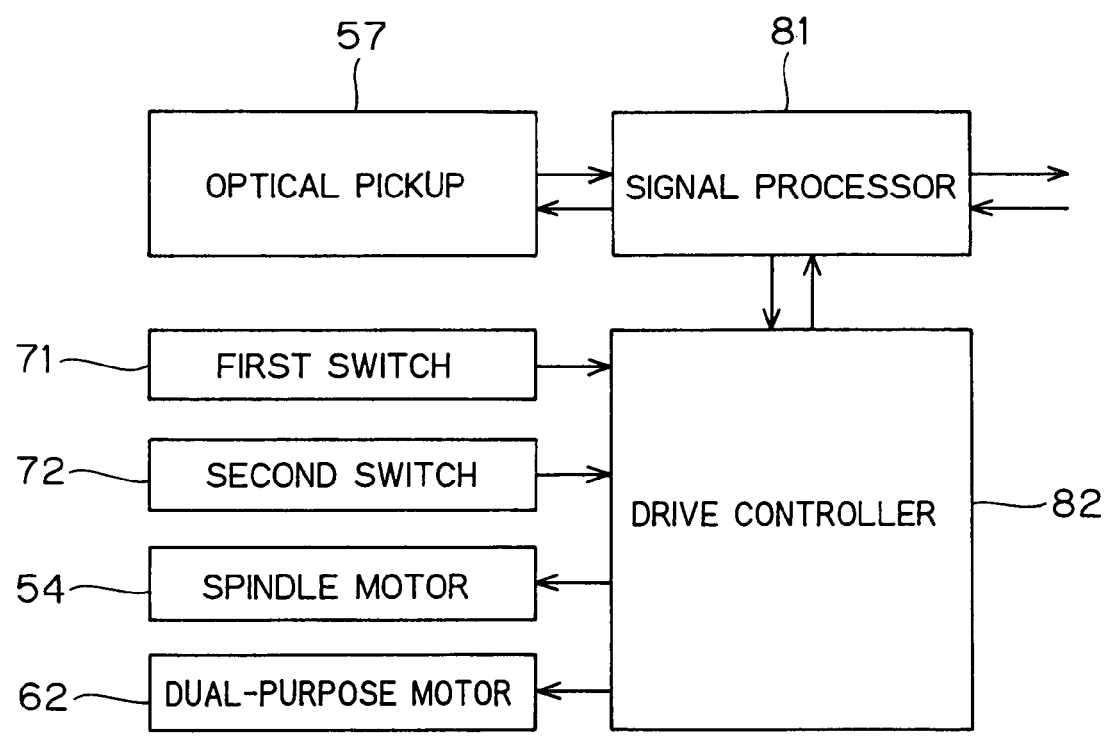
FIG. 18 is a block diagram showing an example of a system constructed using the optical disk device.

FIG. 18 is a block diagram of a system constructed using this optical disk device 1. As shown in FIG. 18, a signal read by the optical pickup 57 is outputted through a signal processor 81 to the outside, or a predetermined signal is provided through the signal processor 81 to the optical pickup 57. A detection output from each of the first switch 71 and the second switch 72 is provided to the drive controller 82, and the positional information read by the optical pickup 57 is provided through the signal processor 81 to the drive controller 82. The driving control of the spindle motor 54 and the dual-purpose motor 62 are effected through a driving circuit not shown under the control of the drive controller 82. The above-mentioned signal processor 81 and the drive controller 82 may be incorporated in an external device (substrate) connected through the relay substrate 70 as will be described later, or be incorporated in the relay substrate 70 itself.

The connection lines from the spindle motor 54 and the dual-purpose motor 62 are attached to the rear surface of the traverse chassis 51 (opposite from the disk tray 12) and are directly soldered to the relay substrate 70. The above-mentioned first switch 71 and second switch 72 are directly mounted on the relay substrate 70.

In this optical disk device, the motors 54, 62 and switches 71, 72 required to drive and control the entire device 1 are all disposed on the traverse unit 50 and are connected in a concentrated manner to the relay substrate 70 mounted to the traverse unit 50. This enables the electrical interconnect lines to be extracted together and connected to an electrical circuit outside the device, thereby establishing connection between the electrical components of this optical disk device and the external electrical circuit except the optical pickup 57. Therefore, the electrical connection is facilitated when this optical disk device is incorporated in the system.

In general, the first switch 71 for detecting whether the disk tray 12 is extended or retracted is often mounted on the loading unit 10 side. In this case, a connection line with connectors is used to establish connection between the first switch 71 and the electrical circuit outside the device, or a connection line from the first switch 71 is soldered to the relay substrate 70 on the traverse unit 50 using a connection line. In the former case, the connection line with connectors is required to be connected to two portions of the electrical circuit outside the device. In the latter case, the connection line is subject to a bending force because of the pivotal movement of the traverse unit 50 caused by the raising/lowering operation of the turntable, and might be broken after prolonged use.

In this optical disk device 1, because the first switch 71 is disposed on the traverse unit 50 and is pivoted together with the relay substrate 70 mounted to the traverse unit 50, an electrical interconnect line for connection therebetween is not subject to the bending force as described above. Therefore, the problem of a break in the electrical connection after prolonged use does not arise.

Additionally, the first switch 71 and the second switch 72, which are disposed directly on the relay substrate 70, eliminate the need for connection lines to aid in constructing the device at low costs.

In the optical disk device constructed as mentioned above, the switching between the pickup feed operation and the turntable raising/lowering operation is done by an operation independent of the optical pickup 57, that is, the operation of the slide rack 58 moving toward the inner region of the optical disk, and does not need the operation of further moving the optical pickup 57 further toward the inner region.

It is therefore unnecessary to use a thin optical pickup as used in a conventional optical disk device, and an optical disk device is constructed using a thick and inexpensive optical pickup. Further, the dual-purpose motor 62 may have a relatively short rotation shaft to reduce the runout of the rotation shaft of the optical disk.

The movement of the trigger plate 69 is driven through both the slide rack 58 and the third gear 67 midway through the movement thereof. Thus, the trigger plate 69 can be subject to a sufficient driving force. This ensures the first operation switching and the turntable raising/lowering operation.

The conversion speed of the trigger plate 69 by the above-mentioned slide rack 58 and the circumferential speed of the third gear on the pitch circle are designed to be equal to each other. This provides smooth intermittent meshing engagement between the tooth portion 69*d* of the trigger plate 69 and the above-mentioned third gear.

The traverse unit 50 of this optical disk device 1 may be used as a traverse unit for an optical disk device of a portable type and an optical disk device of an auto-changer type if the five components, i.e. the first gear 65, the second gear 66, the third gear 67, the fourth gear 68 and the trigger plate 69, are removed.

For example, two component, i.e. a worm gear and a motor, may be added to this optical disk device 1 to directly drive the tray gear 13, thereby driving the disk tray transport mechanism and the turntable raising/lowering mechanism, whereas the above-mentioned five components and the torsion spring 16 be removed instead. In such a case, the optical disk device comprising a very small number of components is achieved.

In other words, the optical disk device described in this embodiment can perform all of the operations of the optical disk device by means of two motors by adding four components (the six components added minus the two components removed) to the above-mentioned optical disk device using three motors as the drive source. Of the components constituting the optical disk device, motors are very costly as compared with mechanical components such as gears. In ordinary cases, about 30 gears can be easily procured at the cost of one motor, depending on the number of productions. Therefore, the optical disk device according to the present invention can be constructed at very low cost, as compared with an optical disk device of the type employing three motors as the drive source.

While the invention has been shown and described in detail, the foregoing description is in all aspects illustrative and not restrictive. It is therefore understood that numerous modifications and variations can be devised without departing from the scope of the invention.

The invention claimed is:

1. An optical disk device capable of storing and ejecting an optical disk for recording or reproducing a signal on said optical disk stored therein, comprising:

a main chassis;

a disk tray movable to extend out of and retract into said main chassis for storing and ejecting said optical disk;

a turntable for rotatably supporting said optical disk stored;

a rotatable drive source mechanism for rotatably driving said turntable;

a turntable raising/lowering mechanism for vertically moving said turntable between a lowered position in which interference with said optical disk stored or ejected is avoided and a raised position in which said optical disk stored is supportable;

an optical pickup for recording a signal on said optical disk supported by said turntable or reproducing a signal;

a pickup drive mechanism for reciprocally moving said optical pickup between an inner region and an outer region of said optical disk supported by said turntable;

a dual-purpose drive source mechanism for generating a driving force for said turntable raising/lowering mechanism and said pickup drive mechanism, where said dual-purpose drive source mechanism includes a dual-purpose motor, and a power transmission mechanism including a gear element rotating under a rotatable driving force of said dual-purpose motor;

a first operation switching mechanism for performing a first switching operation for switching a transmission path of said driving force of said dual-purpose drive source mechanism from a path leading to said pickup drive mechanism to a path leading to said turntable raising/lowering mechanism, or vice versa, where said first operation switching mechanism performs said first switching operation by an operation independent of said optical pickup under said driving force of said dual-purpose drive source mechanism; and a traverse chassis having a pivotal displacement side end portion on one end side thereof and a pivot axis side end portion on the other end side thereof, said pivot axis side end portion being pivotably mounted to said main chassis so that said pivotal displacement side end portion is movable toward and away from said main chassis, said turntable being moved to said raised position by moving said pivotal displacement side end portion toward said main chassis, said turntable being moved to said lowered position by moving said pivotal displacement side end portion away from said main chassis, and where said turntable, said rotatable drive source mechanism, said optical pickup, said dual-purpose drive source mechanism and said first operation switching mechanism are provided on said traverse chassis;

wherein said pickup drive mechanism includes a rack portion provided integrally with said optical pickup for moving said optical pickup under said rotatable driving force of said dual-purpose motor through said gear element;

wherein said first operation switching mechanism includes a slide rack movable under said rotatable driving force of said dual-purpose motor through said gear element, with said rack portion having moved to a position in which said transmission path of said driving force from at least said gear element is interrupted, and performs said first switching operation by moving said slide rack, with said optical pickup placed in a fixed position and where said first operation switching mechanism further includes a trigger plate moving in accordance with the movement of said slide rack; and wherein said turntable raising/lowering mechanism includes a driven boss provided on said pivotal displacement side end portion of said traverse chassis, and a slider member having a cam groove engageable with the driven boss and provided on the main chassis movably in accordance with the movement of said trigger plate, and where the movement of said slider member in accordance with the movement of said trigger plate causes the driven boss moving in said cam groove to move toward or away from said main chassis, thereby moving said pivotal displacement side end portion of said traverse chassis toward or away from said main chassis.

2. The optical disk device according to claim 1, further comprising:

a disk tray transport mechanism for moving said disk tray to extend out of and retract into said main chassis under the driving force of said dual-purpose drive source mechanism; and a second operation switching mechanism for performing a second switching operation for switching the transmission path of the driving force of said dual-purpose drive source mechanism from a path leading to said pickup drive mechanism to a path leading to said disk tray transport mechanism, or vice versa, wherein said main chassis is provided with a tray gear having a first gear portion and a second gear portion and rotatable under the driving force of said dual-purpose drive source mechanism, wherein said slider member has a slider-specific rack portion meshingly engageable with said first gear portion, wherein said disk tray transport mechanism has a tray rack portion extending in a direction in which said disk tray is extended and retracted and meshingly engageable with said second gear portion, wherein said second operation switching mechanism has a tray guide groove and a boss portion, said tray guide groove being provided in said disk tray and including in a continuous fashion a first guide groove extending along a direction orthogonal to said direction in which said disk tray is extended and retracted, a second guide groove angled to said direction in which said disk tray is extended and retracted, and a third guide groove extending along said direction in which said disk tray is extended and retracted, said boss portion being provided on said slider portion and moving in said tray guide groove, and wherein said first gear portion is in meshing engagement with said slider-specific rack portion and said tray gear rotates to move said slider member during an interval that said boss portion passes through said first guide groove; said disk tray moves to extend or retract under a force of movement of said boss portion in said second guide groove, thereby causing a transition from the meshing engagement between said first gear portion and said slider-specific rack portion to meshing engagement between said second gear portion and said tray rack portion or vice versa during an interval that said boss portion passes through said second guide groove; and said second gear portion is in meshing engagement with said tray rack portion and said tray gear rotates to move said disk tray to extend and retract during an interval that said boss portion passes through said third guide groove.

3. The optical disk device according to claim 2,
wherein said first gear portion has a pitch circle radius smaller than that of said second gear portion.

4. The optical disk device according to claim 3,
wherein said first gear portion and said second gear portion are equal in the number of teeth to each other.

5. The optical disk device according to claim 1,
wherein said trigger plate has a tooth portion, and
wherein the driving force from said dual-purpose drive source mechanism is transmitted through said tooth portion in the course of the movement of said trigger plate.

6. The optical disk device according to claim 5,
wherein a speed at which said slider member moves said trigger plate is approximately equal to a speed at which said slider member is moved under the driving force from said dual-purpose drive source mechanism through said tooth portion.

7. The optical disk device according to claim 1, further comprising
an urging member for urging said slider member toward one end of a movable range thereof.

8. The optical disk device according to claim 1,
wherein said dual-purpose drive source mechanism moves said optical pickup once stored toward the outer region of the optical disk after power is turned on.

9. The optical disk device according to claim 1,
wherein said trigger plate has a malfunction prevention wall for abutting against said optical pickup side or said slide rack side to inhibit its own movement prior to the operation of placing said optical pickup in the inner region of the optical disk and the operation of switching the transmission path of the driving force of said dual-purpose drive source mechanism from the path leading to said pickup drive mechanism to the path leading to said turntable raising/lowering mechanism.

10. The optical disk device according to claim 1,
wherein a first detector for detecting whether or not said disk tray is in an extended position based on a position to which said slider member is moved, and a second detector for detecting a position to which said optical pickup is moved are provided on said traverse chassis side.

11. The optical disk device according to claim 10,
wherein said traverse chassis is provided with a relay substrate, and
wherein said first detector and said second detector are provided on said relay substrate.

* * * * *